United States Patent [19]

Kyoden

[11] Patent Number: 4,937,402
[45] Date of Patent: Jun. 26, 1990

[54] SWITCHING DEVICE
[75] Inventor: Tatsuo Kyoden, Isehara, Japan
[73] Assignee: Ichikoh Industries Limited, Tokyo, Japan
[21] Appl. No.: 314,360
[22] PCT Filed: Apr. 15, 1988
[86] PCT No.: PCT/JP88/00381
 § 371 Date: Mar. 9, 1989
 § 102(e) Date: Mar. 9, 1989
[87] PCT Pub. No.: WO88/09558
 PCT Pub. Date: Dec. 1, 1988

[30] Foreign Application Priority Data

| May 29, 1987 | [JP] | Japan | 62-80783[U] |
| May 29, 1987 | [JP] | Japan | 62-80784[U] |
| Jul. 13, 1987 | [JP] | Japan | 62-106268[U] |
| Mar. 25, 1988 | [JP] | Japan | 63-69846 |
| Mar. 28, 1988 | [JP] | Japan | 63-39584[U] |
| Apr. 13, 1988 | [JP] | Japan | 63-48758[U] |

[51] Int. Cl.⁵ .................................... H01H 25/04
[52] U.S. Cl. .................... 200/5 R; 200/6 A; 200/16 C; 200/18; 200/DIG. 29
[58] Field of Search ............... 200/5 R, 11 E, 11 EA, 200/11 J, 11 K, 16 C, 16 D, 17 R, 18, 277, 277.1, 277.2, 547, 549, 553, 557, DIG. 29, 6 A

[56] References Cited
U.S. PATENT DOCUMENTS 3,178,523  4/1965  Farrell .......................... 200/16 C
3,591,740  7/1971  Kolster ......................... 200/11 J
4,698,463  10/1987  Tanaka et al. .................. 200/5 R
4,698,464  10/1987  Tanaka et al. .................. 200/5 R
4,816,662  3/1989  Kyoden ......................... 200/277 X

FOREIGN PATENT DOCUMENTS 53-10074  1/1978  Japan .
58-73537  5/1983  Japan .

Primary Examiner—J. R. Scott
Attorney, Agent, or Firm—Foley & Lardner, Schwartz, Jeffery, Schwaab, Mack, Blumenthal & Evans

[57] ABSTRACT

The present invention relates to a switching device for use as a control switch for the posture-adjustable automotive mirror. The switching device according to the present invention comprises plural fixed contacts disposed in a substantially straight line on a substrate housed in an enclosure, moving contacts formed by two electrically conductive balls disposed movably on the substrate, slider element having two slopes which are in contact with the two balls, a box-shaped actuator comprising a slider which houses the slider element, through holes for guiding the slider parallel to the substrate, and a resilient member disposed between the slider element and the slider, which forces the slider element toward the substrate. Thus, the switching device according to the present invention performs well in operation and durability, as well as ensures a contact between the fixed contacts and the moving contacts.

20 Claims, 29 Drawing Sheets

FIG. 30
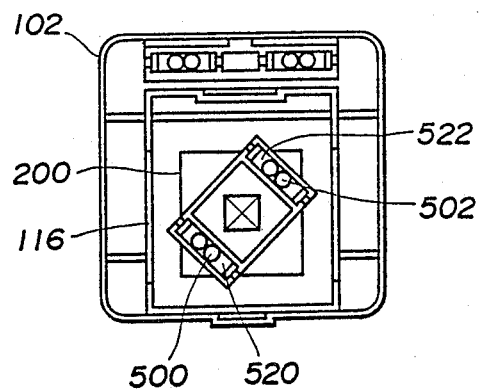
FIG. 32
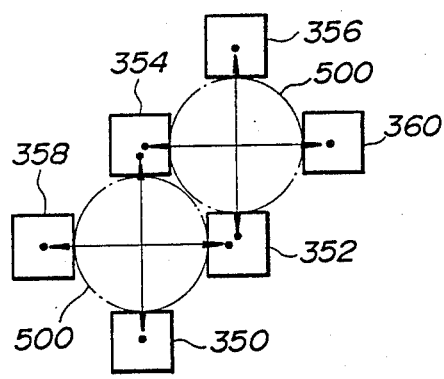
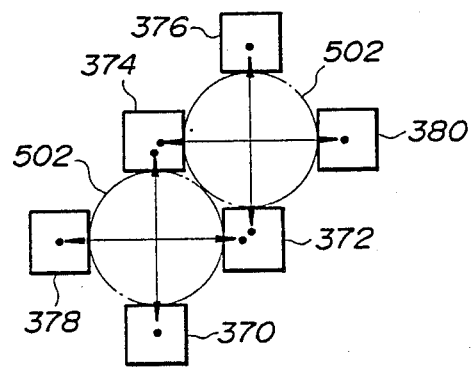

FIG. 33
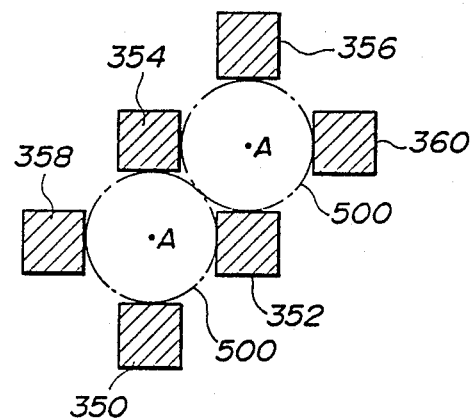
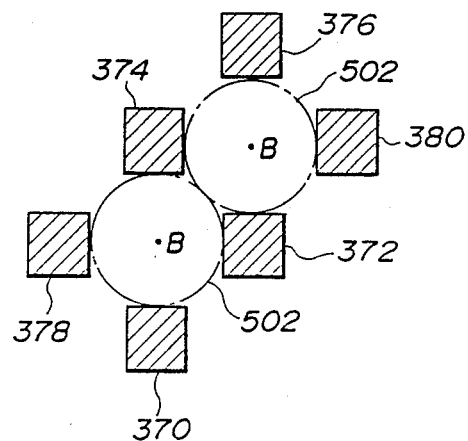

FIG. 34
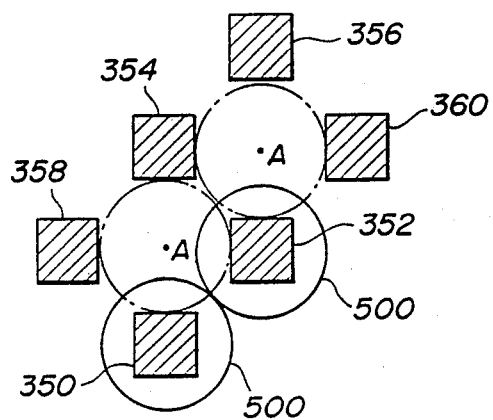
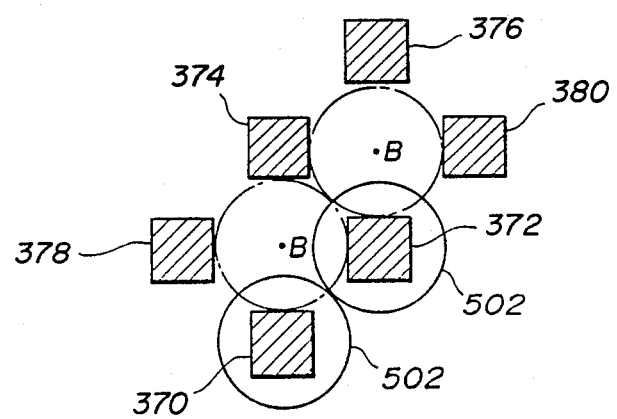

FIG. 35
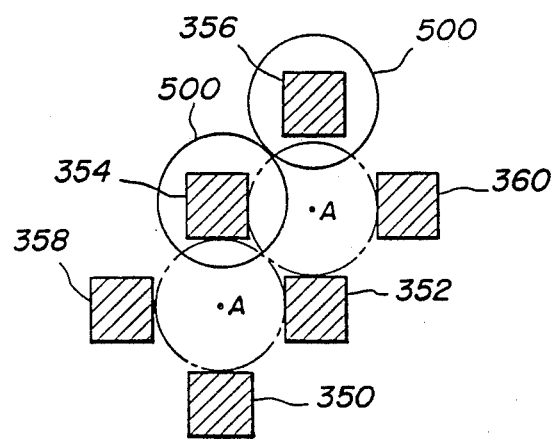
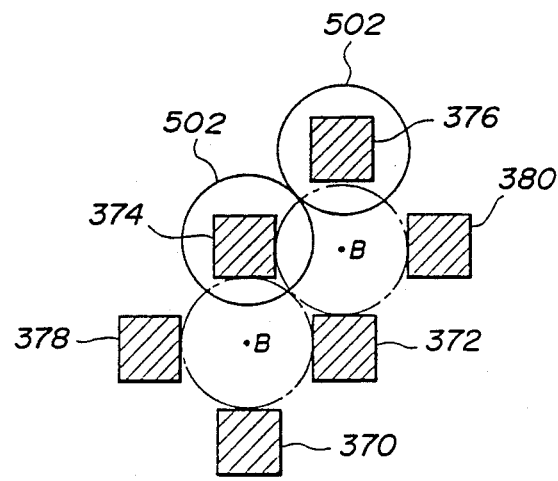

FIG. 36
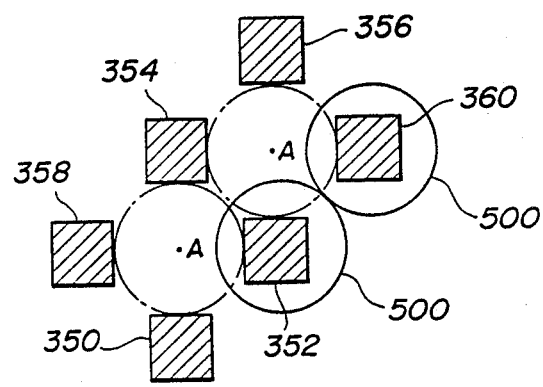
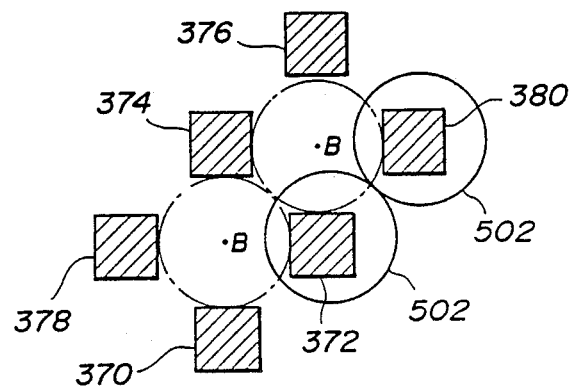

FIG. 37
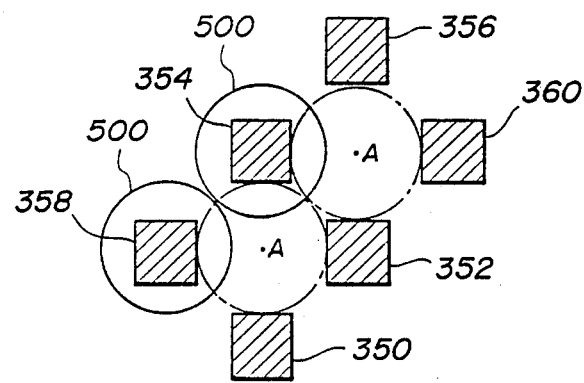
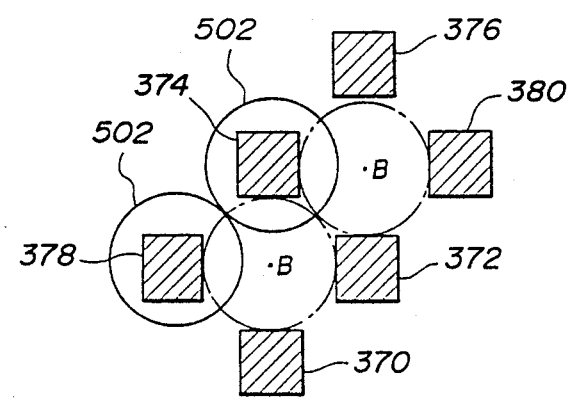

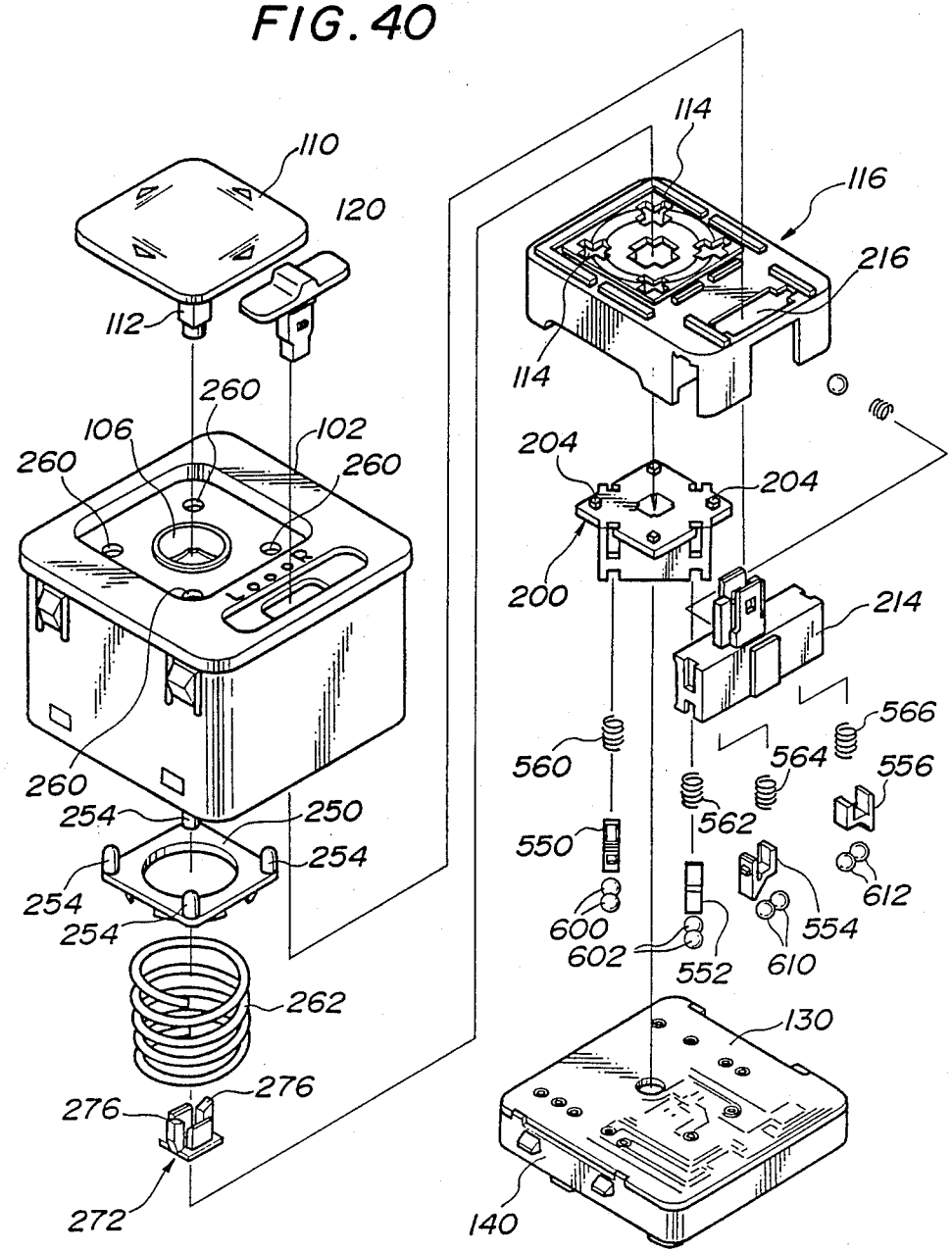

SWITCHING DEVICE

TECHNICAL FIELD

The present invention relates to a switching device, and more particularly to a switching device suitably usable as a control switch for adjustable automotive mirrors.

BACKGROUND ART

Heretofore, there have been proposed various types of control switches for adjustable automotive mirrors. As disclosed in, for example, the U.S. Pat. Nos. 4,698,463 and 4,698,464, such switching device has a structure comprising plural fixed contacts disposed on a printed circuit board (will be referred to as "PCB" hereinafter) formed on a substrate mounted in an enclosure, plural resilient, conductive, arcuate bridge-shaped members slidably disposed on the PCB and of which the opposite ends are used as moving contacts to electrically connect certain ones of the plural fixed contacts to each other, plural actuators corresponding to the bridge-shaped members, of which one ends are in contact with the sections near the ends of the bridge-shaped members while the other ends are exposed outside the upper section of the enclosure, and disposed movably in a direction perpendicular to the PCB, and a square push plate disposed above the enclosure and supported on the exposed other end of the actuator In such switching device, the push plate has four sections carrying markings for tilting (up and down) and turning (right and left), respectively, of the mirror surface to be adjusted in posture. When the driver of the car presses any of these four sections of the push plate by finger, a corresponding actuator is moved, thereby deforming a corresponding bridge-shaped member to electrically connect corresponding fixed contacts to each other In the switching device of this type, plural arcuate bridge-shaped members are provided of which the opposite ends are used as moving contacts, and each of them is resiliently deformed by a corresponding actuator to provide a switching. At this time, the ends of the bridge-shaped member slide while being in surface contact with the PCB or fixed contents, so that sometimes the moving contacts do not smoothly move or a poor contact occurs between the moving and fixed contacts due to any mechanical fatigue of the bridge-shaped member material or to any abrasion of the contacts.

The present invention has an object to overcome the drawbacks of the switching devices of the above-mentioned type by providing a switching device excellent in operability and durability and in which a contact is positively made between the fixed and moving contacts.

DISCLOSURE OF THE INVENTION

The switching device according to the present invention can be applied to a switch unit using a pair of electrically conductive balls as moving contacts. The ball contents in this pair are disposed on a substrate having formed thereon a printed circuit board (will be referred to as "PCB" hereinafter; the PCB will also referred to as "substrate" hereinafter) mounted inside a housing and two slant surfaces of a slider element are in contact with the contact balls in the pair. An elastic member is disposed between the slider element and box-shaped slider which houses the slider element to forced the slider element toward the PCB. The slider is so constructed as to be guided in a predetermined direction by a guide member disposed within the enclosure so that certain two of plural fixed contacts are connected to each other by means of the ball contact pair, and also the slider is moved manually by an operating member so that the certain two fixed contacts are electrically connected to each other.

In case the switching device according to the present invention is applied to a switch unit having a moving contact comprising a pair of ball contacts, the moving contact move smoothly, and the frictional abrasion between the moving and fixed contacts is less and the switch unit is highly durable. Since the switching device has a structure in which the moving contact is moved along with the slider and the slider element is forced toward the PCB, the pair of ball contacts being the moving contact can be put into point contact with the PCB under an even pressure, and thus an improved operability of the switch unit is ensured.

With another resilient member provided between the enclosure and slider to force the slider in the arrayed direction of the fixed contacts, the switching is done only while the actuating member is in action, and when no pressure is applied, the slider returns to its initial position.

Furthermore, the actuating member may be formed in the form of an operating knob formed integrally with the slider. A switching device according to the present invention having the actuating member extended in a direction perpendicular to the arrayed direction of the fixed contacts through an opening formed in the enclosure will provide a suitable sliding switch for the purpose of mirror-posture control. Also if an operating end is formed which projects in a direction parallel to the arrayed direction of the fixed contacts through an opening formed in the enclosure and there is disposed between the enclosure and slider a resilient member which forces the slider toward the opening. Thus, the switching device may be used as a push switch. Further, if the actuating member is shaped in the form of an operating lever which is tiltable in relation to the enclosure and it is projected at the end thereof out of the opening formed in the enclosure, the switching can be done by tilting the operating lever. Namely, the basic construction of the switching device according to the present invention may be applied to every kind of switches.

In case three fixed contacts are arrayed in a line, the position in which the ball contact pair is in contact with the adjoining two fixed contacts is the first contact position, the position where the ball contact pair is is contact with the adjoining other two fixed contacts is the second contact position. Thus, a two-position switch can be constructed. Also, a three-position switch may be constructed by taking as neutral position the position between the first and second contact positions.

An actuator may be composed of a slider element having slopes which are in contact with one of the ball contact pairs and a slider having slopes which are contact with the other of the ball contact pairs and houses the slider element in such a manner that the slider element is movable perpendicularly to the PCB, and resilient members may be interposed between the slider element and slider to force the slider element toward the PCB. Since the ball contact pairs are slid as forced toward the PCB under a stable pressure without any wobbling of the slider element housed in the slider due to the clearance between the slider element and slider, a stable switching is ensured.

The switching device according to the present invention presents many advantages in case it is applied to the control switch, so-called four-way switch, for the posture-adjustable automotive mirror in addition to the switch unit having been described.

There are disposed on the PCB made of an insulating material plural sets of fixed contact groups each consisting of plural fixed contacts space from one another and electrically conductive ball contact pairs corresponding to each fixed contact group and which are movable on the PCB. A slider element having two slopes which are in contact with the ball contact pair and retain the ball contact pair so that the ball contacts in the pair are in contact with themselves and also with the PCB is formed correspondingly to each ball contact pair, and it is housed in a slider. The slider elements and slider are used together to form an actuator. Resilient members are interposed between each slider element and slider to force each slider element toward the PCB. The actuator is guided by a means of guiding so that each ball contact pair is selectively put into contact with any of the plural fixed contact pairs belonging to the fixed contact group. The actuating member moving the actuator is constructed in the form of a push plate having four sections each indicating a moving direction of the mirror surface, and it is disposed pivotably in relation to the enclosure. The push plate has an actuating rod extending in the direction of the PCB, of which the end is so formed as to slide the actuator. When the driver of a car presses any of the direction-marked sections of the push plate, the actuating rod is tilted in a predetermined direction, with the result that the actuator slides in a predetermined direction and each ball contact pair takes a different contact position in which it is put into contact with any of the fixed contact pairs belonging to each fixed contact group.

The actuator may be constructed with slider elements each having a slope which is in contact with one of the balls composing each ball contact pair and a slider having a slope which is in contact with the other ball in the ball contact pair and which houses the slider elements in such a manner that each slider element is movable in a direction perpendicular to the PCB. A resilient element is interposed between each slider element and the slider to force each slider element toward the PCB. This will be apparent from the description made with reference to the above-mentioned switch unit.

The fixed contact group may be disposed in four sets on the PCB correspondingly to the four direction-marked sections of the push plate and each of the fixed contact groups may be composed of two fixed contact pairs spaced from each other. When any of the four direction-marked sections of the push plate is pressed, one set of ball contact pairs corresponding to the direction-marked section and one set of ball contact pairs corresponding to the direction-marked section opposite to the pressed one take the respective first contact positions in which they are put into contact with one and the other, respectively, of the fixed contact pairs belonging to the corresponding fixed contact groups, respectively. When the direction-marked section opposite to the pressed one is pressed, each ball contact pair takes the second contact position where it is put into contact with the other fixed contact pair belonging to the corresponding fixed contact group, while the remaining two sets of ball contact pairs are moved without contact with the corresponding fixed contact group. Also when one of the remaining direction-marked sections or the rest opposite to that section is pressed, two sets of ball contact pairs take the third or fourth contact position in which they are put into contact with one or the other fixed contact pair belonging to the corresponding fixed contact group, while the remaining two sets of ball contact pairs are moved without contact with the corresponding fixed contact group.

Also, only two sets of fixed contact groups may be disposed for construction the switching device according to the present invention. In this case, two sliders are to be disposed. Thus, the structure of the actuator can be simplified. Each fixed contact group is composed of three fixed contacts arranged in an array in a straight line, and two fixed contact pairs parallel to each other with the straight line placed between them and arrayed in two straight lines, respectively, parallel to the above-mentioned straight line. When one of the direction-marked sections of the push plate is pressed, each ball contact pair takes a first contact position in which it is put into contact with one of the two fixed contact pairs belonging to each corresponding fixed contact group. When the direction-marked section opposite to the pressed direction-marked section is pressed, each ball contact pair takes a second contact position in which it is put into contact with the other of the two fixed contact pairs belonging to each corresponding fixed contact group. In case one of the remaining two direction-marked sections of the push plate is pressed, each ball contact pair takes a third contact position in which it is put into contact with the adjoining two of the three fixed contacts. If the rest of the remaining direction-marked sections is pressed, each ball contact pair takes a fourth contact position in which it is put into contact with the adjoining other two of the three fixed contacts.

The above-mentioned arrayed direction of each ball contact pair is perpendicular or parallel to the moving direction of the actuator. However, it is not limited to this configuration but all the ball contact pairs may be so housed in the enclosure that they are always slanted with respect to the moving direction of the actuator.

In the switching device according to the present invention, an inner casing may be provided which houses and guides the actuator inside the enclosure, guide recesses be formed in the inner casing to guide the actuator, and the actuator may have formed thereon protrusions which can be moved along the guide recesses.

Furthermore, there may be provided in the center of the top of the actuator a concavity in which the end of the actuating rod of the push plate is inserted, so that the actuator slides in a predetermined direction in response to the tilting motion of the actuating rod. Also, a plate-like member having four protrusions which extend out of the enclosure and are in contact with the push plate may be interposed between the inner casing and enclosure, and resilient members which force the plate-like member toward the enclosure may be disposed between the inner casing and plate-like member to enable the end of the actuating rod to return each ball contact pair to the neutral position when the pressing of the push plate is over.

These and other objects and advantages of the present invention will be better understood from the ensuing description made, by way of example, of the embodiments of the present invention with reference to the drawings.

BRIEF DESCRIPTION OF THE DRAWINGS

FIGS. 5 thru 20 show an embodiment of a control switch for a posture-adjustable automotive mirror to which the switching device according to the present invention is applied, of which FIG. 9 is a perspective view showing the entire control switch;

FIG. 10 is an exploded perspective view;

FIG. 11 is a sectional view taken along the line 11—11 in FIG. 9;

FIG. 12 is a bottom view showing the control switch with the PCB removed from the enclosure;

FIG. 13 is a drawing for explanation of the contact relation between a group of fixed contacts disposed on the PCB and the ball contact pair;

FIG. 14 is a schematic drawing showing the geometric relation among the ball contact pair, slider element and the coil springs forcing the slider element;

FIG. 15 is a bottom view of the slider;

FIG. 16 is a sectional view taken along the line 16—16 in shown in FIG. 15;

FIG. 17 is a plan view of the inner casing in which a guide track is formed;

FIG. 18 is a sectional view taken along the line 18—18 in FIG. 17;

FIG. 19 is a front view of the push plate;

FIG. 20 is a perspective view of the resetting plate;

FIGS. 21 to 29 show another embodiment of a control switch composed of two sets of fixed contact groups, to which the switching device according to the present invention is applied, of which, FIG. 21 is a circuit pattern diagram showing the arrangement of each fixed contact in the two sets of fixed contact groups;

FIG. 22 is a bottom view showing the control switch using the two sets of fixed contact groups shown in FIG. 21, from which the PCB is removed;

FIGS. 23 thru 29 show typical diagrams, respectively, of fixed contacts for explanation of the contact relation between each of the fixed contacts and the ball contact pair;

FIGS. 30 thru 38 show a yet another embodiment of a control switch having two sets of fixed contact groups and in which two sets of ball contact pairs are disposed as slanted with respect to the moving direction of the operating piece, to which the switching device according to the present invention is applied, of which FIG. 30 is a bottom view showing the control switch with the PCB removed;

FIG. 31 is a circuit pattern diagram showing the arrangement of fixed contacts belonging to the fixed contact group;

FIGS. 32 thru 38 are typical diagrams, respectively, of fixed contacts for explanation of the contact relation between each of the fixed contacts and the ball contact pair;

FIGS. 39 thru 45 show a further embodiment of a control switch having two sets of fixed contact groups, two sets of ball contact pairs disposed as slanted with respect to the moving distance of the operating piece and each slider element movable perpendicularly to the PCB, to which the switching device according to the present invention is applied, of which FIG. 39 is a plan view of the control switch;

FIG. 40 is an exploded perspective view;

FIG. 41 is a bottom view of the control switch with the PCB removed;

FIGS. 42 thru 45 are sectional views taken along the lines 42—42, 43—43, 44—44 and 45—45, respectively, in FIG. 39, FIGS. 42 and 43 being fragmental sectional views, respectively.

DETAILED DESCRIPTION OF THE PREFERRED EMBODIMENTS

Figure 1:
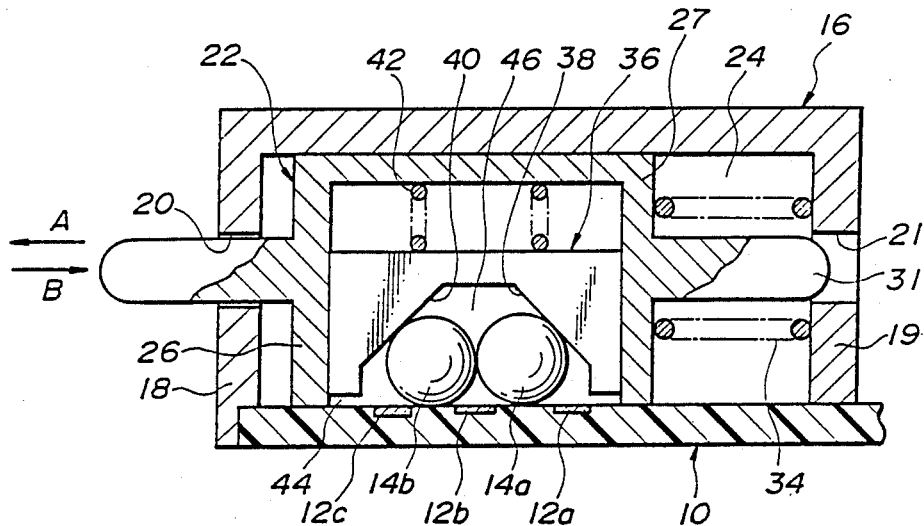
FIG. 1 is a schematic drawing for explanation of the basic construction of a push switch to which the switching device according to the present invention is applied.

FIG. 1 shows an embodiment of the switching device according to the present invention, which is constructed in the form of a self-resetting push switch. In FIG. 1, the reference numeral 10 indicates a substrate composed of a printed circuit board (PCB) having an electrical insulative property. There are provided on the top surface of the substrate 10 three rectangular contacts 12a, 12b and 12c arrayed on the moving track of a pair of ball contacts 14a and 14b which will be described later. The number of these fixed contacts is not limited to three, but it may be two, 4 or more. The substrate 10 is fixed in a lower opening of a enclosure 16. In practice, the enclosure 16 is a rectangular paparallopiped longer in the arrayed direction of the fixed contacts. In this embodiment, the enclosure 16 houses a slider as an operating piece which will be described later, and guides the movement of the slider.

The enclosure 16 has end walls 18 and 19 opposite to each other in the arrayed direction of the fixed contacts, in which through-holes 20 and 21 are formed, respectively. The slider 22 as actuating piece is disposed slidably in the arrayed direction of the fixed contacts in a space 24 defined by the substrate 10 and enclosure 16. The slider 22 take the form of a rectangular parallelopiped and having end walls 26 and 27 opposite to each other, on which projections 30 and 32 are formed, respectively, which are ended in the arrayed direction of the fixed contacts and introduced into the through-holes 20 and 21, respectively, formed in the enclosure 16. The projection 30 extends out of the through-hole 20 and serves as an actuator which moves the slider 22 as operating piece as will be described later, and has attached on the end thereof an operating knob (not shown) with a stopper. The slider 22 has fitted on the projection 31 thereof a compression coil spring 34 of which the one end is in contact with the outer surface of the end wall 27 of the slider 22 and the other end is in contact with the inner surface of the end wall 19 of the enclosure 16. Thus the slider 22 is always forced in the direction of arrow A.

There is disposed inside the slider 22 a slider element 36, slidable in a direction nearly perpendicular to the substrate 10. The slider element 36 has formed on the lower side thereof slopes 38 and 40 opposite to each other, which are in contact with the ball contacts 14a and 14b, respectively, in pair and form an angle of 45 degrees, respectively, with respect to the substrate 10. Compression coil springs 42 are interposed between the slider 22 and the slider element 36. When the slopes 38 and 40 of the slider elements 36 are in contact with the ball contacts 14a and 14b, respectively, in pair, some clearance 44 remains between the lower end of the slider element 36 and the substrate 10.

Figure 2:
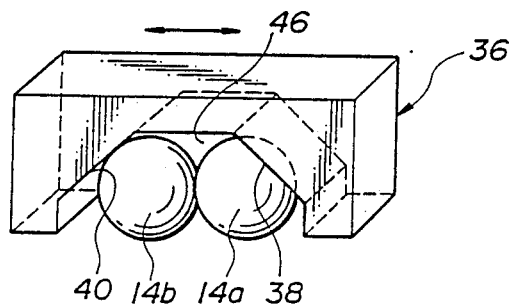
FIG. 2 is a perspective view showing a pair of ball contacts and a slider element.

The ball contacts 14a and 14b in pair are made of a smooth-surfaced electrically conductive material and housed in a space defined by the slopes 38 and 40 of the slider element 36 and the substrate 10 and of which the section is generally trapezoidal as shown in FIG. 2. While in contact with each other, these ball contacts 14a and 14b are forced toward the substrate 10 with a generally even force from the compression coil springs 42. As obviously seen, the ball contacts 14a and 14b, held in that condition, are rolled on the substrate 10 by moving the slider 22 parallel to the substrate 10.

In the switching device of the above-mentioned construction, since the slider 22 is always forced in the direction of arrow A, as the actuating knob attached on the end of the projection is pushed in the direction of arrow B against the force of the springs 34, the ball contacts 14a and 14b in pair take their respective first contact positions in which they are in contact with the fixed contacts 12a and 12b, respectively. When the actuating knob is released, the ball contacts 14a and 14b in pair are returned to their initial positions under the action of the springs 34 and take their respective second contact positions in which they are in contact with the fixed contacts 12b and 12c, respectively. In this condition, the outer surface of the end wall 26 is in contact with the inner wall of the enclosure 16. The actuating knob has provided thereon the stopper (not shown) intended for preventing the slider 22 from further sliding in the direction of arrow B when the ball contacts 14a and 14b take the above-mentioned second contact positions, but a stopper may be provided on the substrate 10 or enclosure for that purpose. As will be apparent, in this switching device, the pair of ball contacts takes the first contact position only when it is pushing the actuating knob provided on the end of the projection 30 in the direction of arrow B, and it is returned to the second contact position when it is not pushing the actuating knob.

Figure 3:
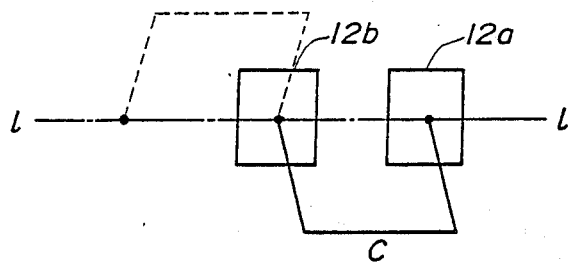
FIG. 3 is a schematic diagram showing a circuit configuration of the switch unit shown in FIG. 1 using two fixed contacts.
Figure 4:
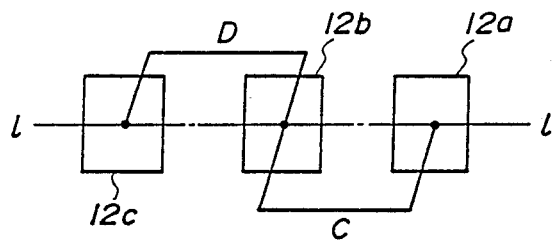
FIG. 4 is a schematic diagram showing a circuit configuration of the switch unit shown in FIG. 1 using three fixed contacts.

FIGS. 3 and 4 show simple circuit configurations in which two and three fixed contacts are used, respectively. In case two fixed contacts are used, the switching device in FIG. 1 comprises the fixed contacts 12a and 12b except for the fixed contact 12c. Normally in this case, the ball contact 14a is in contact with the fixed contact 12b while the ball contact 14b is with the substrate 10, the circuit C formed by the fixed contacts 12a and 12b remains open. When the actuating knob is being pushed in the direction of arrow B, the ball contact 14a is in contact with the fixed contact 12a while the ball contact 14b is with the fixed contact 12b, whereby the circuit C is closed. In FIG. 4, a circuit composed of the fixed contacts 12a and 12b and a circuit D composed of the fixed contacts 12b and 12c are shown. Since normally in this case, the ball contact 14a is in contact with the fixed contact 12b while the ball contact 14b is with the fixed contact 12c, the circuit D is closed while the circuit C is open. It will be obvious from the illustration that when the actuating knob is being pushed in the direction of arrow B, the ball contact 14a gets into contact with the ball contact 12a while the ball contact 14b is put into contact with the fixed contact, the circuit C is closed while the circuit D is open.

Figure 5:
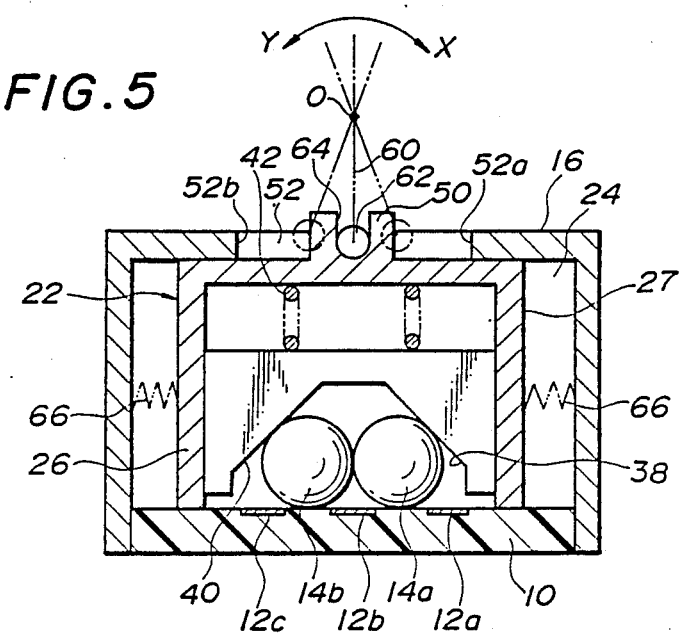
FIG. 5 is a schematic drawing for explanation of the basic construction of a slide switch or a switch unit with a tiltable self-resetting operating lever to which the switching device according to the present invention is applied.

FIG. 5 shows a variant embodiment maintaining the basic construction but which uses an actuating member which actuates the slider 22 as actuating piece. In FIG. 5, the same or like elements as in FIG. 1 are indicated with the same and like reference numerals. The slider 22 has formed integrally therewith and on the top thereof a protrusion 50 extending perpendicularly to the substrate 10 and serving as the actuating knob. The enclosure 16 has formed therein in a position corresponding to the protrusion 50 an elongated opening 52 in the arrayed direction of the fixed contacts 12a, 12b and 12c, along which the actuating knob 50 is movable. When the actuating knob 50 abuts the one 52a of the opening ends, the ball contacts 14a and 14b take their respective first contact positions in which they are in contact with the fixed contacts 12a and 12b, respectively, while when the actuating knob 50 abuts the opening end 52b as slid reversely, the ball contacts 14a and 14b take their respective second contact positions. The actuating knob 50 of this type is applicable to a control switch for posture adjustment of the automotive mirror assemblies mounted at either side of a car and of which the surface posture is adjustable. In FIG. 5, the neutral position is shown in which neither the ball contact 14a nor 14b are in contact with the fixed contacts 12a and 12b. A mechanism to temporarily hold the slider 22 in that neutral position may be provided to release that temporary holding when sliding the actuating knob 50.

Also in FIG. 5, a concavity 64 is formed in the central top, or the protrusion or actuating knob 50, of the slider 22, and a control lever 60 is mounted tiltably in relation to the enclosure 16 as indicated with two-dot and dash line, the lever having the end thereof placed on the bottom of the concavity 64. As the control lever 60 is tilted about the fulcrum O in the direction of arrow X or Y, the slider 22 can be reciprocated parallelly to the substrate 10. Also, there are disposed between the outer surfaces of the opposite end walls 26 and 27 of the slider 22 and the inner wall of the enclosure 16 spring members 66 which normally maintain the ball contacts 14a and 14b in pair in the neutral position shown in FIG. 5, whereby when the actuating force applied to the control lever 60 is removed after the ball contacts 14a and 14b in pair are let to take the first or second contact position by tilting the control lever 60, the slider 22 can be returned to the initial position with the resilient returning force of the spring members 66 and the ball contacts 14a and 14b can take their respective neutral positions.

Figure 6:
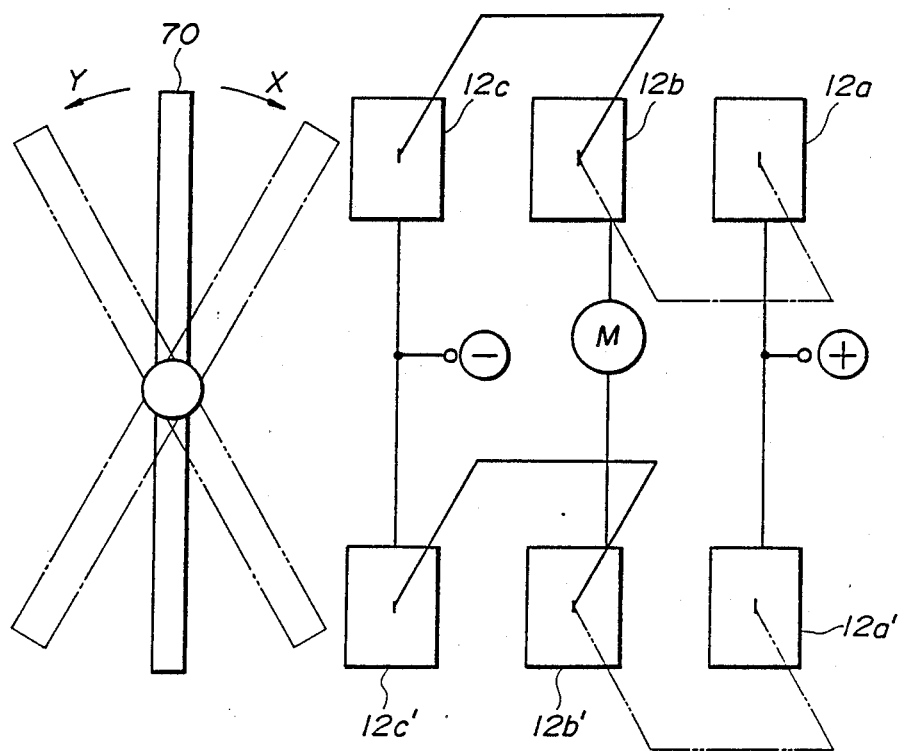
FIG. 6 is a schematic diagram of a circuit configuration for reversible run of an electric motor by means of two sets of the basic switch constructions shown in FIG. 5.

FIG. 6 schematically shows a circuit formed using two sets of the switch unit shown in FIG. 1 and which drives a motor M forwardly or reversely. For example, two sliders 22 are disposed in parallel in the enclosure 16, one of the sliders 22 housing a pair of ball contacts 14a and 14b and the other housing a pair of ball contacts 14a' and 14b'. Two sets each of three fixed contacts are disposed correspondingly in the moving paths, respectively, of the sliders 22, namely, in the rolling tracks, respectively, of the pairs of ball contacts, and a see-saw type control knob 70 is disposed to pressing the protrusion as actuating member for each slider 22. The fixed contacts in the two sets are 12a, 12b and 12c and 12a', 12b' and 12c', respectively. The fixed contacts 12a and 12a' are connected to the positive pole of the battery, the fixed contacts 12b and 12b' are connected to the negative pole of the battery, and the fixed contacts 12c and 12c' are connected to the terminal of the motor M. Normally, the ball contacts 14a and 14b are in contact with the fixed contacts 12b and 12c while the ball contacts 14a' and 14b' are with the fixed contacts 12b' and 12c'. When the control knob 70 is pushed in the direction of arrow X, the slider housing the fixed contacts 12a, 12b and 12c is actuated, thereby putting the ball contacts 14a and 14b into contact with the fixed contacts 12a and 12b, respectively. When the control knob 70 is pushed in the direction of arrow Y, the slider housing the fixed contacts 12a', 12b' and 12c' is actuated, thereby putting the ball contacts 14a' and 14b' into contact with the fixed contacts 12a' and 12b'.

In the normal condition, the ball contacts 14a and 14b are in contact with the fixed contacts 12b and 12c, respectively, while the ball contacts 14a' and 14b' are with the fixed contacts 12b' and 12c', respectively, so that the two terminals of the motor M are at the ground potential and so the motor M is put into run.

When the control knob 70 is pushed in the direction of arrow X, the ball contacts 14a and 14b are moved into contact with the fixed contacts 12a and 12b, but the ball contacts 14a' and 14b' are not moved and remain connected with the fixed contacts 12b' and 12c', respectively. Hence, since the terminal of the motor M at the side of the fixed contact 12b takes a positive potential while the terminal at the side of the fixed contact 12b' takes the ground potential, the motor M runs forwardly. On the contrary, when the control knob 70 is pushed in the direction of arrow Y, the ball contacts 14a and 14b returned to their initial positions, respectively, where they are put into contact with the fixed contacts 12b and 12c while the ball contacts 14a' and 14b' are moved into contact with the fixed contacts 12b and 12c, respectively. Thus, the terminal of the motor M at the side of the fixed contact 12b takes the ground potential while the terminal at the fixed contact 12b' takes a positive potential, so that the motor M runs reversely, namely, in a direction opposite to the above.

Figure 7:
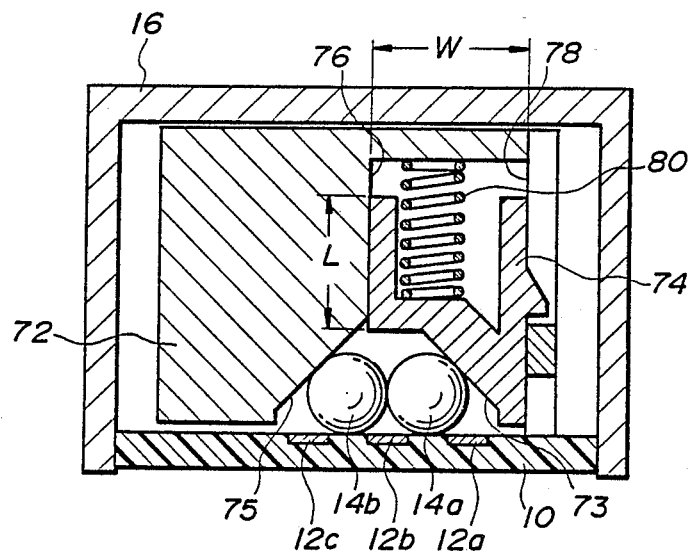
FIG. 7 is a schematic drawing for explanation of the basic construction of a switch unit in which the operating piece is so formed that the slider element is disposed movably in relation to the slider and perpendicularly to the PCB.
Figure 8:
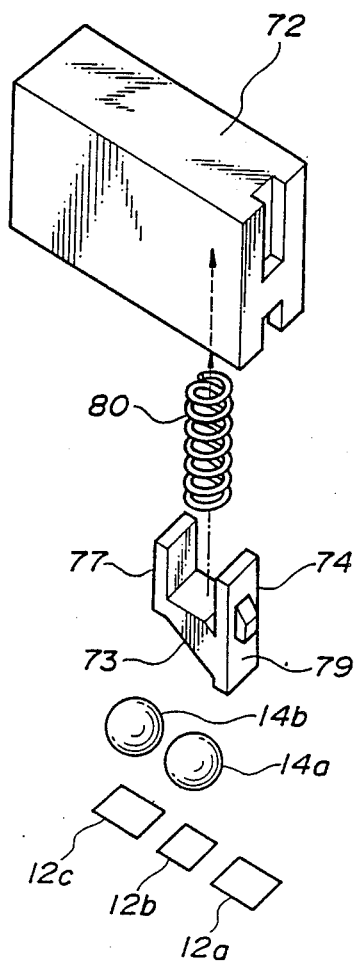
FIG. 8 is a schematic exploded perspective view of the basic construction of the switch unit shown in FIG. 7.

FIGS. 7 and 8 schematically illustrate a switch unit having a modified actuating piece for moving the ball contact pair. There is provided a slider 72 corresponding to the slider 22 shown in FIG. 1, and a slider element 74 corresponding to the slider element 36 in FIG. 1. The two slopes which are in contact with the ball contacts are formed on both the slider 72 and slider element 74, respectively. Namely, one slope 73 of the two slopes is positively formed on the slider 72 while the other slope 75 is formed on the slider element 74 which is disposed slidably in relation to the slider 72 and perpendicularly to the substrate 10 while in contact with the slider 72, and a coil spring 80 is disposed between the slider 72 and the slider element 74 to force the slider element 74 toward the substrate 10. The vertical surfaces 76 and 78 of the slider 72 and the vertical surfaces 77 and 79 of the slider element 74 are in contact with each other (namely, surface 76 with surface 77 and surface 78 with surface 79), and they are so formed that the slider element 74 can slide smoothly. In particular, the distance W between the two vertical surfaces 76 and 78 opposite to each other is nearly equal to the vertical length L of the vertical surface 77 of the slider element 74 so that when the slider 72 slides parallel to the substrate 10, the slider element 74 will not easily be deflected between the vertical surfaces 76 and 78 of the slider 72. Since the slider element 74 with the slope 75 is forced by the coil spring 80, the one 14a of the ball contacts 14a and 14b in pair is forced by the slope 75 toward the substrate 10 as well as toward the ball contact 14b and also the ball contact 14b, in contact with the slope 73, is similarly forced toward the substrate 10. Hence, the ball contacts 14a and 14b are forced toward the substrate 10 with a stable pressure also when the slider 72 slides in a direction parallel to the substrate 10 so that they can be put into contact with the fixed contacts under a stable contact pressure.

FIGS. 9 thru 20 show an embodiment of a control switch for a posture-adjustable automotive mirror to which the switching device according to the present invention is applied.

Figure 9:
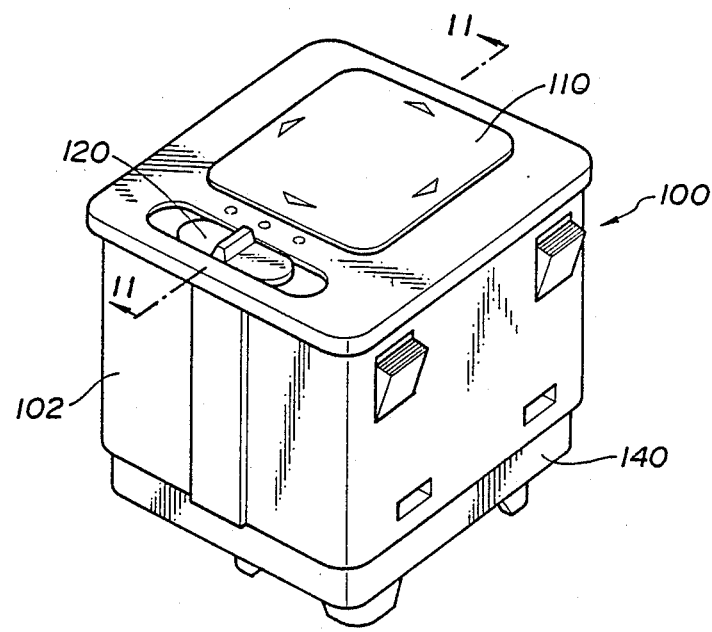
Figure 10:
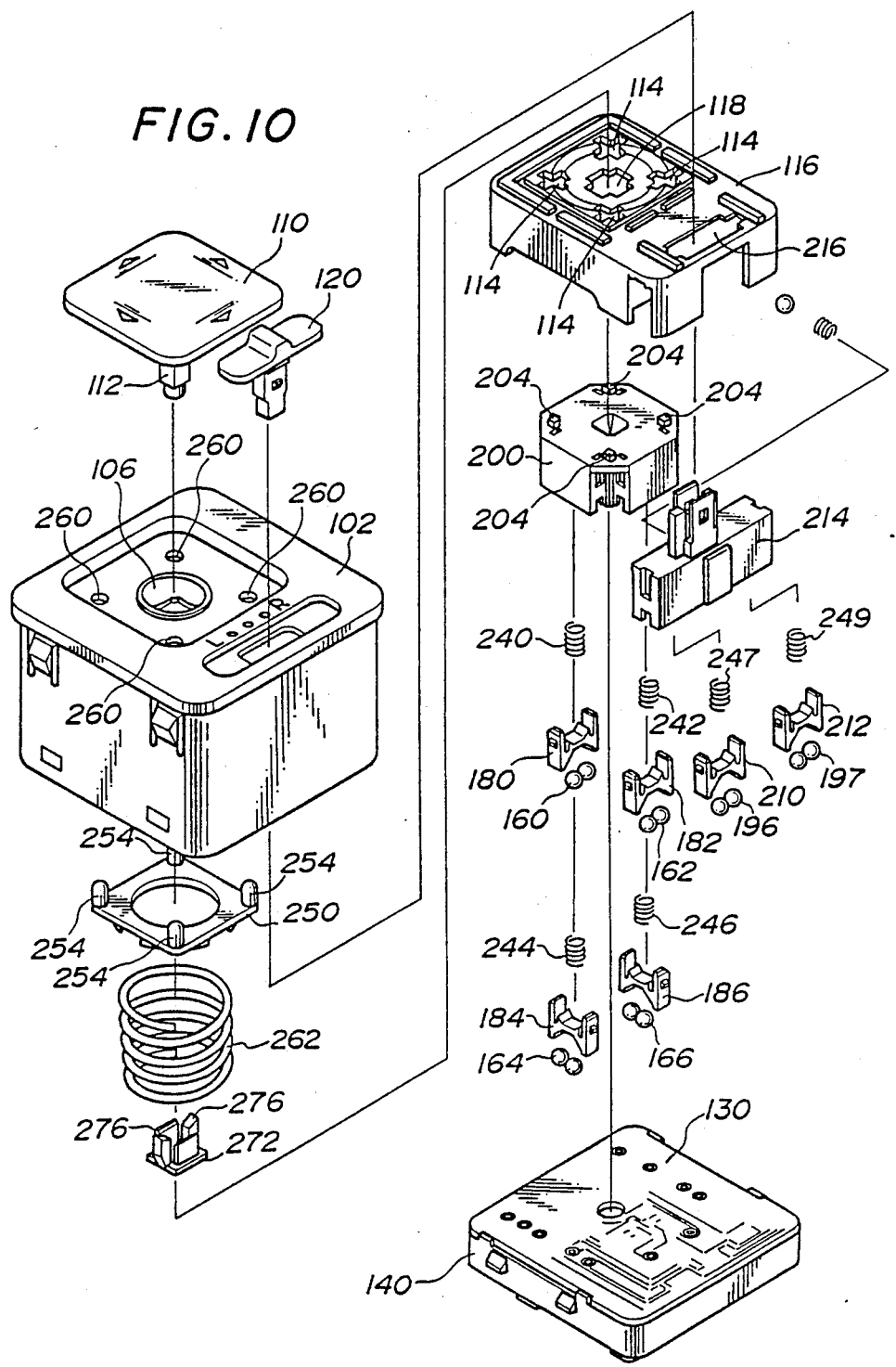

In FIG. 9, the control switch as a whole is indicated with a reference numeral 100. The control switch 100 has a box-shaped outer casing 102 on the top of which there are provided a push plate 110 serving as manual control member of a so-called 4-way switch and which turns or tilts the mirror surface in any of the vertical and horizontal directions, and a control knob 120 of a changeover switch to select either the two right and left mirrors for posture adjustment. The four sets of fixed contact groups composing the 4-way switch and the two sets of fixed contact groups composing the changeover switch are formed on a printed circuit board (PCB) 130 mounted on a holder 140 fitted in the lower opening of the outer casing 102, and a pair of ball contacts (will be described later) as moving contacts which selectively connects certain fixed contacts among these fixed contact groups to each other is disposed movably on a PCB 130.

Figure 13:
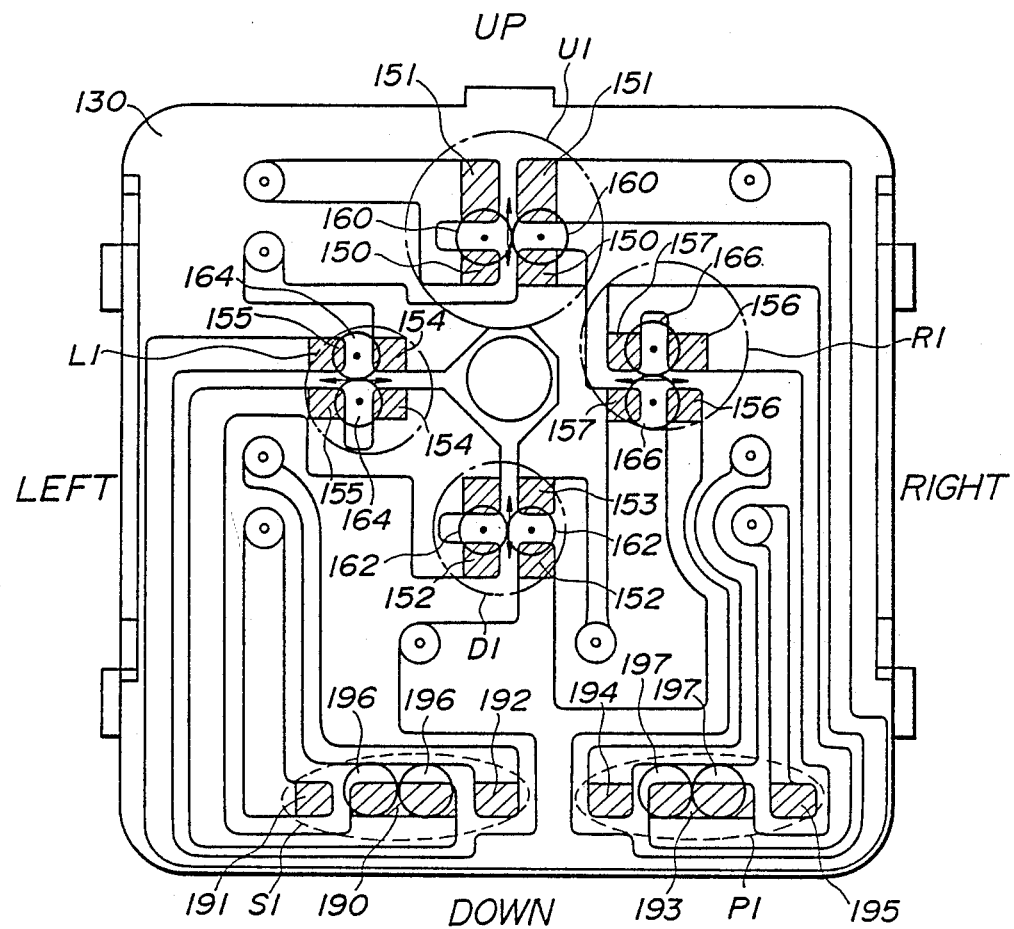

The push plate 110 has marked thereon four symbols for tilting the mirror surface upward and downward, and for turning it rightward and leftward, namely, for tilting it about the horizontal axis and turning it about the vertical axis, respectively. In FIG. 13, the directions are marked with UP, DOWN, LEFT and RIGHT, respectively. As shown also in FIG. 13, two sets each of a pair of fixed contact 150 and 151, 152 and 153, 154 and 155, and 156 and 157 are provided as fixed contact groups U1, D1, L1 and R1 for the UP and DOWN tilting, LEFT and RIGHT turning, respectively, and sets each of a pair of ball contacts 160 and 160, 162 and 160, 164 and 164, and 166 and 166 are provided for the fixed contact group U1, D1, L1 and R1, respectively.

Ball contacts in each pair are maintained as in contact with each other by slider elements 180, 1802, 184 and 186 which will be explained later and each of which is housed in a slider 200 so as to be movable with the slider 200 as actuating piece. The slider 200 is disposed slidably on the PCB 130 in a direction defined by connecting the fixed contact groups U1 and D1 to each other and also in a direction defined by connecting the fixed contact groups L1 and R1 to each other. The fixed contact pairs 150 and 151, and 152 and 153 are disposed on the moving tack of the ball contact pairs 160 and 162, respectively, while the fixed contact pairs 154 and 155, and 156 and 157 are disposed on the moving track of the ball contact pairs 164 and 166, respectively.

Also two sets of fixed contact groups S1 and P1 composing the changeover switch are arrayed along the lower edge, respectively, of the PCB 130. The fixed contact group S1 consists of fixed contacts 190, 191 and 192, while the fixed contact group P1 consists of fixed contacts 193, 194 and 195. As in the 4-way switch, there are disposed correspondingly to the two sets of the fixed contact groups S1 and P1 two sets of ball contact pairs 196 and 197 of which the pairs of ball contacts are held as in contact with each other by the slider elements 210 and 212, respectively. The slider elements are so housed together in a slider 214 as actuating piece of the changeover switch as to be slidable horizontally on the PCB 130.

Normally, the ball contact pairs composing the 4-way switch are not in contact with any fixed contact pair belonging to the corresponding fixed contact groups. When the push plate is pressed at the UP-marked section thereof, the ball contact pairs 160 and 162 are put into contact with the fixed contact pairs 150 and 152, respectively, while the ball contact pairs 164 and 166 remain in contact with the PCB 130. When the push plate is pressed at the DOWN-marked section thereof, the ball contact pairs 160 and 162 get into contact with the fixed contact pairs 151 and 153, respectively, while the ball contact pairs 164 and 166 remain in contact with the PCB 130. In case the push plate is pressed at the UP- or DOWN-marked section thereof in this way, one of the two sets of fixed contact pairs belonging to the fixed contact group U1 is connected to one of the two fixed contact pairs belonging to the fixed contact group D1 by means of the corresponding ball contact pair to run forwardly or reversely the motor which tilts the mirror surface about the horizontal axis.

Similarly, when the push plate is pressed at the LEFT-marked section thereof, the ball contact pairs 164 and 166 are put into contact with the fixed contact pairs 154 and 156, respectively, belonging to the fixed contact groups L1 and R1, while the ball contact pairs 160 and 162 remain in contact with the PCB 130. When the push plate is pressed at the RIGHT-marked section thereof, the ball contact pairs 164 and 166 are put into contact with the fixed contact pairs 155 and 157, respectively, while the ball contact pairs 160 and 162 remain in contact with the PCB 130. In case the push plate is pressed at the LEFT- or RIGHT-marked section thereof in this way, one of the two sets of fixed contact pairs belonging to the fixed contact group L1 is connected to one of the two fixed contact pairs belonging to the fixed contact group R1 by means of the corresponding ball contact pair to run forwardly or reversely the motor which turns the mirror surface about the vertical axis.

Further, the two sets of ball contact pairs 196 and 197 composing the changeover switch are normally in contact with the fixed contacts 190 and 193, respectively. When the control knob 120 is pushed leftward to slide the slider 214 in order to select the mirror surface of the leftside mirror of the car, one of the ball contacts in pair 196 is put into contact with the fixed contact 194. Thus, the fixed contacts 190 and 191 among the three fixed contacts belonging to the fixed contact group S1 are connected to each other while the fixed contacts 193 and 194 among the three fixed contacts belonging to the fixed contact group P1 are connected to each other. Also when the control knob 120 is pushed rightward to slide the slider 214 in order to select the mirror surface of the rightside mirror of the car, one of the ball contacts in pair 196 is put into contact with the fixed contact 192 while one of the ball contacts in pair 194 gets into contact with the fixed contact 195. Thus, the fixed contacts 190 and 192 among the three fixed contacts belonging to the fixed contact group S1 are connected to each other while the fixed contacts 193 and 195 among the three fixed contacts belonging to the fixed contact group P1 are connected to each other. It will be thus understood that certain two of the three fixed contacts belonging to the fixed contact groups S1 and P1 are connected to each other by means of the corresponding ball contact pair to select the mirror at either side of the car for posture adjustment.

Figure 15:
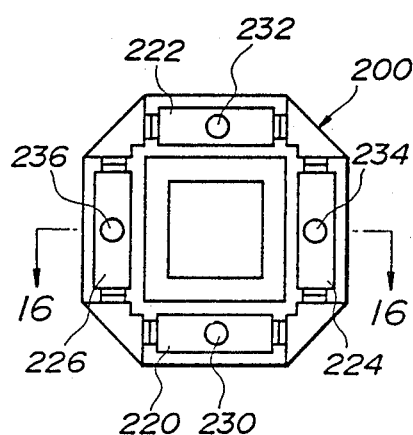
Figure 16:
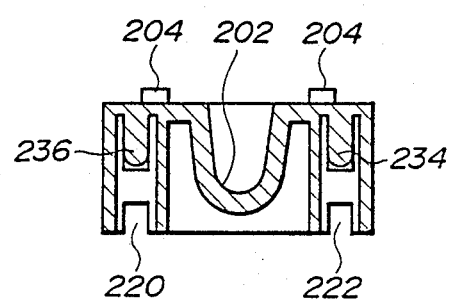

As having been described previously with the switch unit shown in FIG. 1, the slider elements 180, 182, 184 and 196 retaining the ball contact pairs 160, 162, 164 and 166, respectively, have slopes which are in contact with the respective ball contacts, and they are housed in the box-shaped compartments 220, 222, 224 and 226 formed at the portions of the slider 200 facing the PCB 130 as shown in FIGS. 15 and 16. There are provided vertically from the bottoms of the compartments generally cylindrical elongated protrusions 230, 232, 234 and 236, respectively, and compression coil springs 240, 242, 244 and 246 are fitted on the respective protrusions. One end of each coil spring is in contact with the bottom of the box-shaped compartment while the other end is with the upper flat top of each slider element. These coil spring serves to force the corresponding slider elements toward the PCB 130 and each slider elements is slidable in the extending direction of the corresponding protrusion within each box-shaped compartment.

Similarly, the slider elements 210 and 212 retaining the ball contact pairs 196 and 197 composing the changeover switch are housed in the box-shaped compartments (not shown) formed in the slider 214 and forced toward the PCB 130 by means of compression coil springs 247 and 249, respectively.

Figure 11:
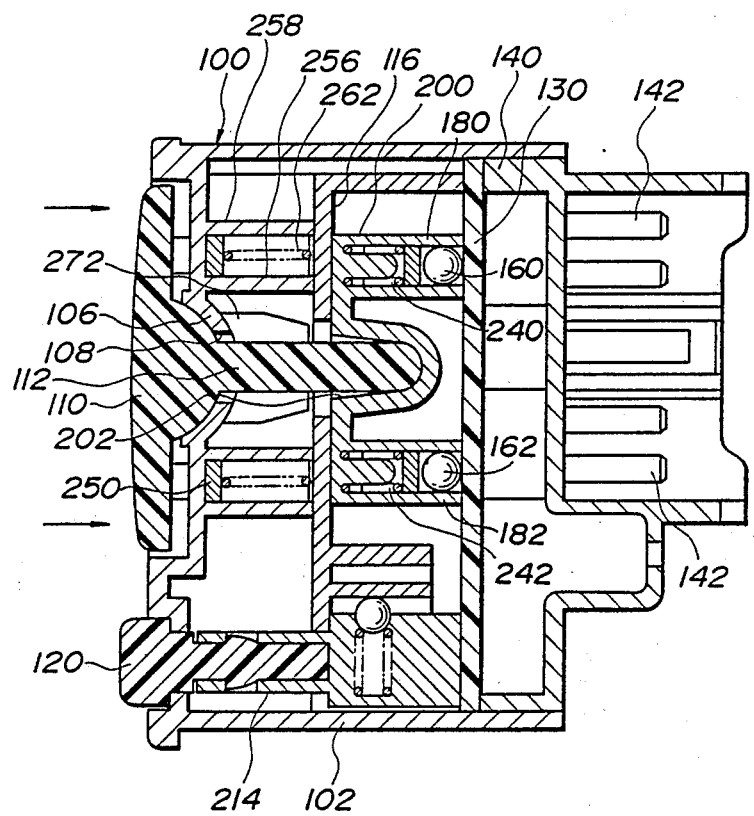
Figure 12:
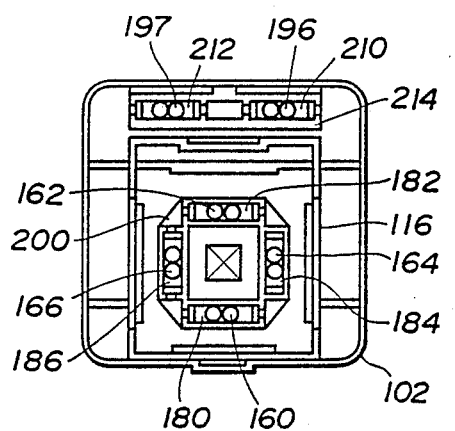
Figure 14:
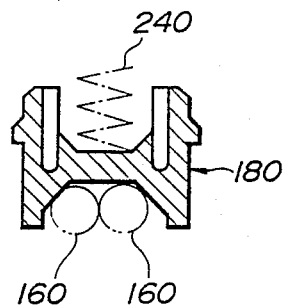
Figure 17:
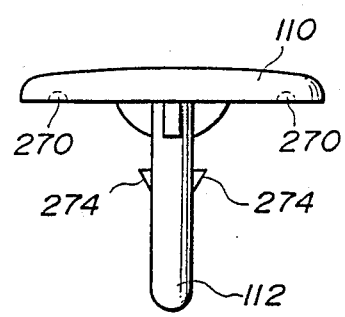
Figure 18:
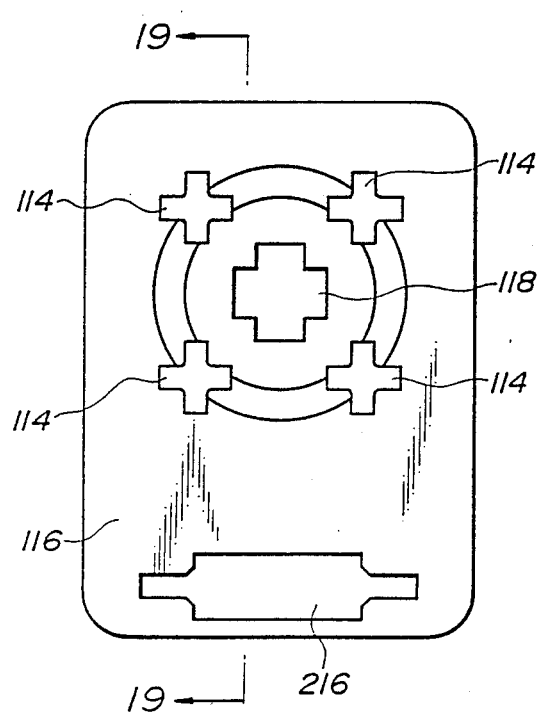
Figure 19:
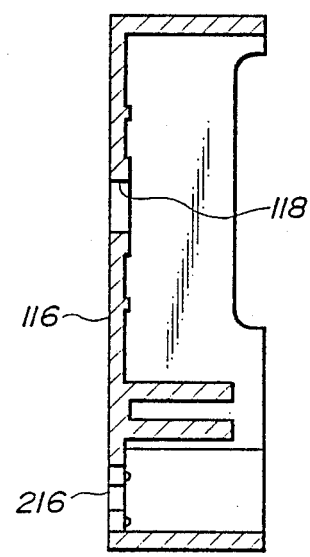
Figure 20:
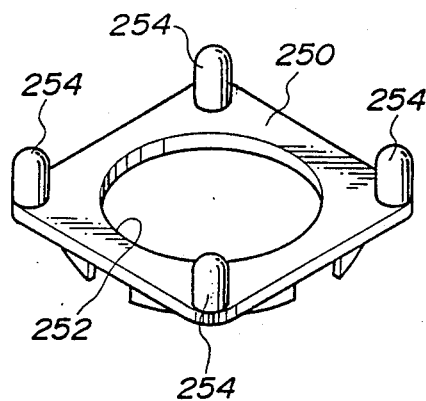

The slider 200 having been described in the foregoing is moved parallel to the PCB 130 by an actuating rod 112 formed at the push plate side opposite to the side on which the four direction-marks are provided, extending vertically downward toward the PCB 130 as shown in FIGS. 11 and 17. The rear central section of the push plate 110 is formed like a semi-sphere and this semispheric section is rotatably supported in a receiving seat 106 formed on the top of the enclosure 102. The actuating rod 112 is passed through a circular opening 108 formed in the center of the receiving seat 106. The end of the actuating rod 112 is inserted into the concavity 202 formed in the center of the slider 200. When the push plate 110 is pressed at any of the direction-marked sections thereof, it is tilted about the receiving seat 106 to move the slider 200. When the push plate 110 is pressed at the UP-marked section thereof, for example, the end of the actuating rod 112 is tilted toward the DOWN-marked section, the slider 200 is moved downward as shown in FIG. 13 so that the ball contact pairs 160 and 162 are put into contact with the fixed contact pairs 150 and 152, respectively. FIGS. 18 and 19 show an inner case 116 in which four guide ways 114 for guiding the slider 200 in four directions. The inner case 116 houses the sliders 200 and 214 in the space they define with respect to the PCB 130 and four protrusions 204 formed on the top of the slider 200 are disposed facing the corresponding guide ways 114. Further, there are formed in the middle of the inner case 116 an opening 118 through which the aforementioned actuating rod 112 is passed, and an elongated rectangular guide way 216 for guiding rightward and leftward the slider 214 composing the changeover switch. Furthermore, there is disposed between the inner casing 116 and outer casing 102 a nearly square plate-like member 250 shown in FIGS. 10 and 20 in the center of which a circular opening 252 is formed, and a nearly cylindrical protrusion 254 is extending toward the top of the outer casing 102. The plate-like member 250 consists of a hollow cylindrical section 256 formed as extending from the circumference of the receiving seat 106 of the outer casing 102 toward the PCB 130 and for walls formed outside of the hollow cylindrical section 256, and disposed in a space defined with respect to a housing wall 258 formed having a nearly same size as the plate-like member 250. There is interposed between the lower surface of the plate-like member 250 and the top of the inner casing 116 a compression coil spring 262 along the outer wall of the hollow cylindrical section 256. The plate-like member 250 is forced toward the outer casing 102 and has four protrusions 254 of which the ends extend out of holes 260 formed at corresponding sections in the outer casing 102 and are in contact with concavities 270 formed correspondingly in the rear side of the push plate 110. In practice, the actuating rod 112 has formed thereon pawls 274 to prevent the push plate 110 from being disengaged from the outer casing 102 and secure to the actuating rod 112 a fixture 276 having pieces 276 fitting the rear side of the receiving seat 106. Therefore, the push plate 110 is always fored outwardly by a compression coil spring 262 so that the actuating rod 112 is applied with a force which always maintains the slider 200 at the neutral position, whereby the moment the manual operating force applied any of the four direction-marked sections of the push plate 110 is released, the slider 200 is returned to the neutral position.

Figure 22:
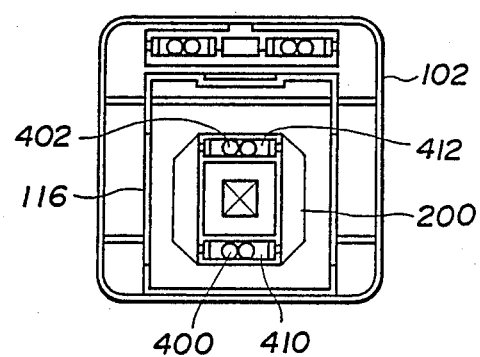
Figure 23:
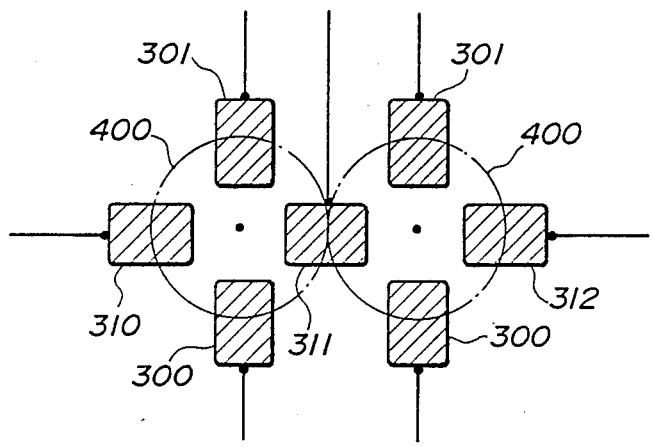
Figure 21:
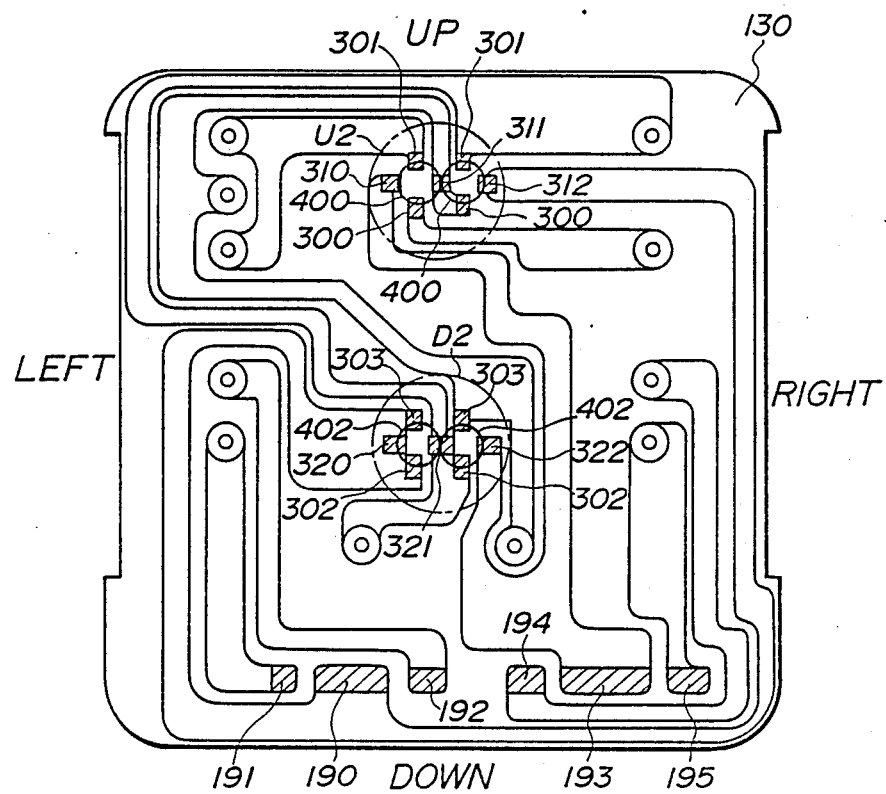
Figure 24:
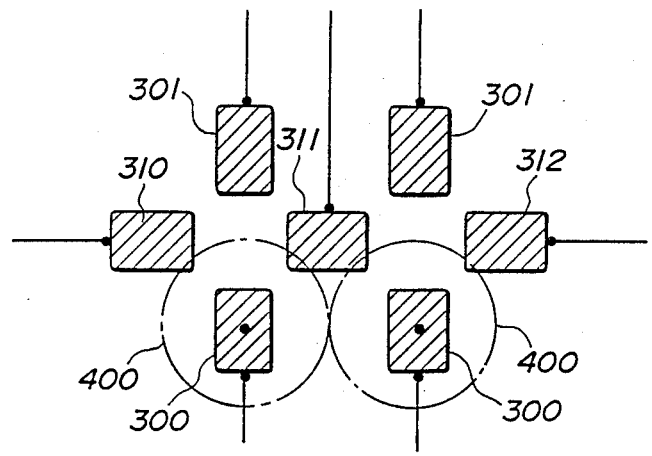
Figure 25:
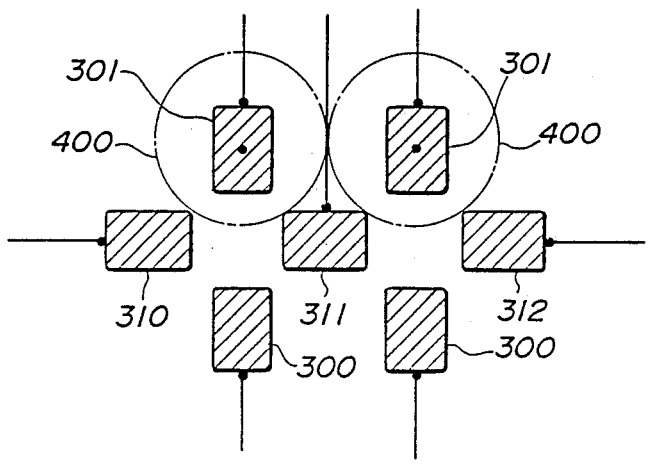
Figure 26:
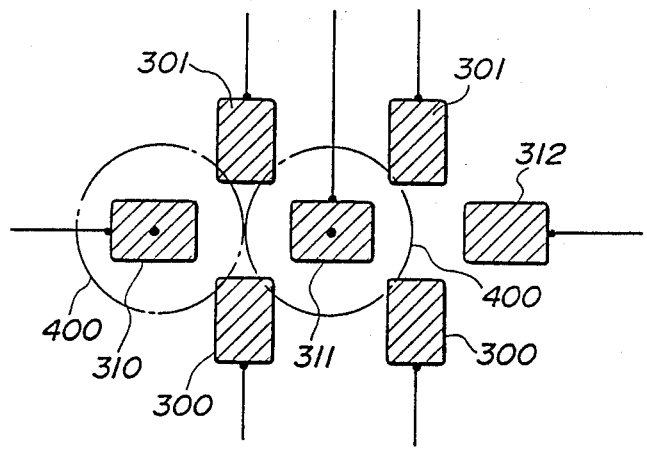
Figure 27:
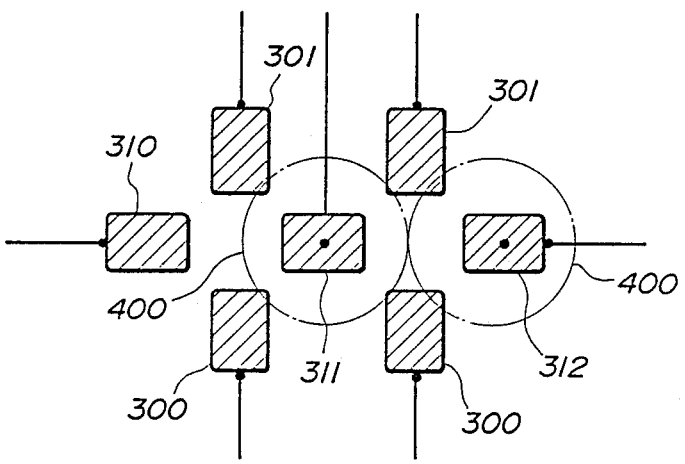

FIGS. 21 thru 29 show an embodiment of a control switch using two sets of fixed contact groups to which the switching device according to the present invention is applied. In these drawings, the same or similar elements as in the afore-mentioned embodiment are indicated with the same reference numerals. In FIG. 21, two sets of fixed contact groups U2 and D2 are provided at the upper and lower sections on the PCB 130 in the place of the drawing. Further, two sets of ball contact pairs 400 and 402 are provided correspondingly to the two sets of fixed contact groups U2 and D2. The slider 200 has provided thereon two slider elements 410 and 412 which house the two sets of ball contact pairs 400 and 402, respectively, as shown in FIG. 22. Basically, the two sets of ball contact pairs 160 and 162 disposed at the upper and lower sections in the afore-mentioned embodiment are used as they are. However, the other two sets of ball contact pairs 164 and 166 disposed at the right and left sections may be omitted. The fixed contact group U2 comprises the two sets of fixed contact pairs 300 and 301 arrayed on the moving track of the ball contact pair 400. The fixed contact pairs 300 and 301 are arrayed in straight lines, respectively, parallel to each other and which are spaced from each other a distance nearly equal to the distance over which the slider 200 can move vertically. There are arrayed three fixed contacts 310, 311 and 312 in another line parallel to and positioned between these straight lines. As shown in FIG. 23, the ball contact pair 400 is normally disposed between the fixed contacts 310 and 311 and also between the fixed contacts 311 and 312, namely, at the neutral position. The distance between these adjoining fixed contacts adjoining is nearly equal to the distance over which the slider 200 can be moved horizontally. The fixed contact group D2 comprises two sets of fixed contact pairs 302 and 303 arrayed on the moving track of the ball contact pair 402. As in the fixed contact group U2, the group D2 further comprises three fixed contacts 320, 321 and 322. A circuit configuration composed of fixed contact groups as shown in FIG. 21 is different from the circuit configuration of the aforementioned embodiment, but it is a basic one in view of the fact that the contacts in the circuit configuration in FIG. 21 are so arranged as to let either the motor for tilting the mirror surface about the horizontal axis or the motor for turning the mirror surface about the vertical axis run forwardly or reversely.

When the push plate 110 is pressed at the UP-marked section thereof, the two sets of ball contact pairs 400 and 402 are moved downwar from the neutral position and the ball contact pair 400 is put into contact with the fixed contact pair 300 (as in FIG. 24) while the ball contact pair 402 gets into contact with the fixed contact pair 302 so the the fixed contact pairs are electrically connected to each other. Thereby, the motor for tilting the mirror surface about the horizontal axis runs forwardly so that the mirror surface is directed upward. When the push plate 110 is pressed at the DOWN-marked section thereof, two sets of ball contact pairs 400 and 402 are moved upward from the neutral position, and the ball contact pair 400 is put into contact with the fixed contact pair 201 (as in FIG. 25) while the ball contact pair 402 gets into contact with the fixed contact pair 303 so that the fixed contact pairs are electrically connected to each other. Thus, the motor for tilting the mirror surface about the horizontal axis runs forwardly to tilt the mirror surface downward. When the push plate 100 is pressed at the RIGHT-marked section thereof, two sets of ball contact pairs 400 and 402 are moved leftward from the neutral position so that the ball contacts in pair 400 are put into contact with the fixed contacts 310 and 311, respectively (as in FIG. 26) while the ball contacts in pair 402 are in contact with the fixed contacts 320 and 321, respectively. When the push plate 110 is pressed at the LEFT-marked section thereof, two sets of ball contact pairs 400 and 402 are moved rightward from the neutral position so that the ball contacts in pair 400 are put into contact with the fixed contacts 311 and 312, respectively (as in FIG. 27) while the ball contacts in pair 402 are in contact with the fixed contacts 321 and 322, respectively. Thereby, the motor for turning the mirror surface about the vertical axis runs forwardly or reversely to turn the mirror surface rightward or leftward.

Figure 28:
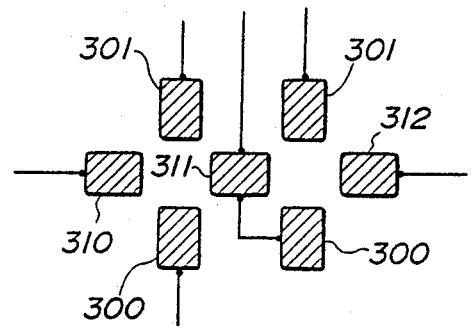
Figure 29:
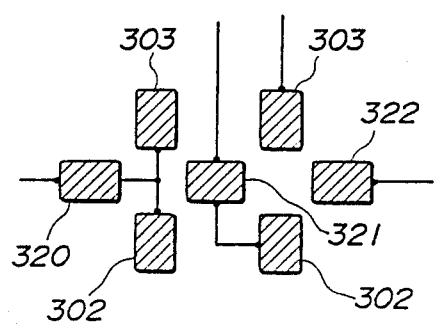

Since in the circuit configuration shown in FIG. 21, one of the fixed contacts in pair 311 and one of the fixed contacts in pair 300 are always connected to each other in practice, these fixed contact pairs have not to be provided separately but they are formed on a same conductive pattern. In case they are provided separately, it suffices to electrically connect the fixed contacts to each other as shown in FIG. 28. Also, since one of the fixed contacts in pair 303, fixed contact 320 and one of the fixed contacts in pair 302 are always connected electrically to one another while the fixed contact 321 and the other of the contacts in pair 302 are always connected electrically to each other, these contacts may not be provided as separate fixed contacts but may be formed in a same conductive pattern. In case they are formed separately, it suffices to electrically connect the fixed contacts to each other as shown in FIG. 29.

FIGS. 30 thru 38 show an embodiment of a control switch using two sets of fixed contact groups and in which two sets of ball contact pairs are disposed as slanted with respect to the moving direction of the slider as control piece, to which the switching device according to the present invention is applied. In these Figures, the same or similar elements as in the aforementioned embodiment are indicated with the same reference numerals.

Figure 31:
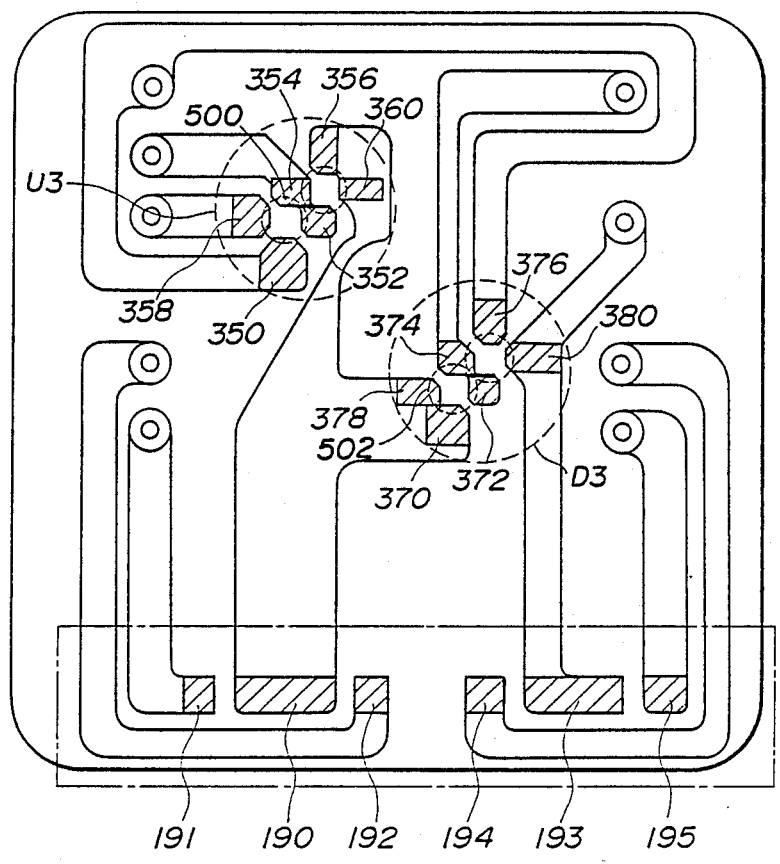
Figure 38:
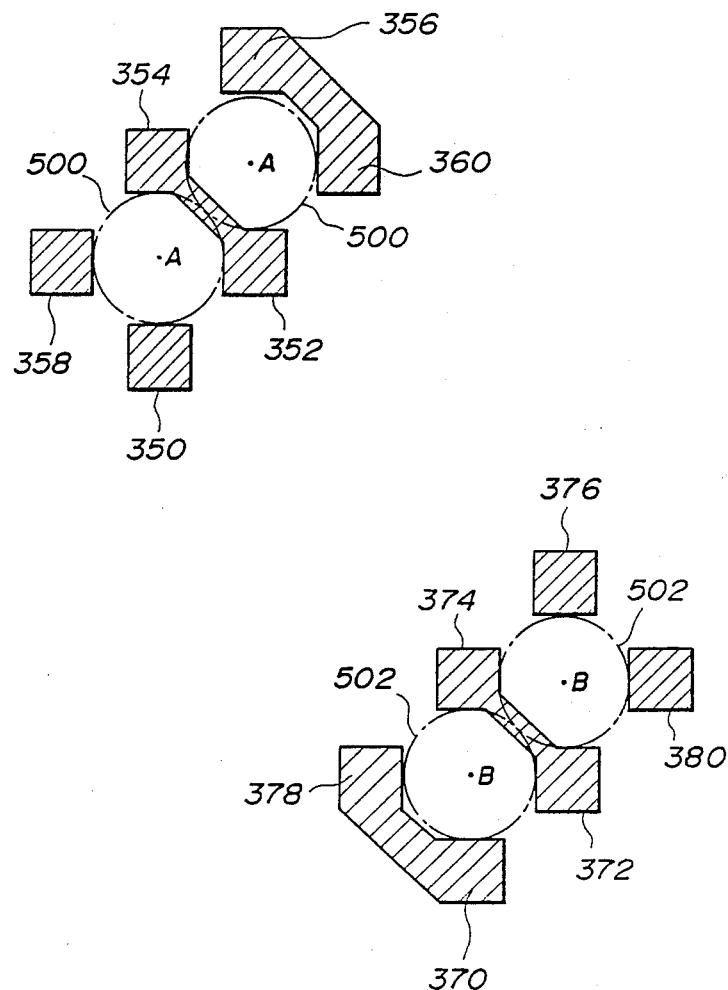
Figure 39:
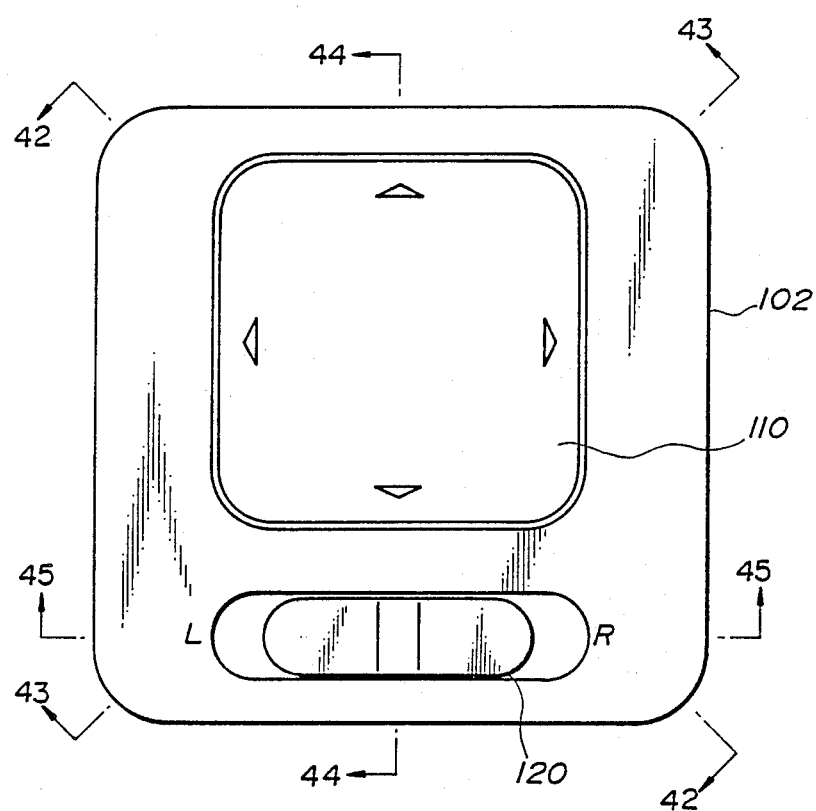
Figure 41:
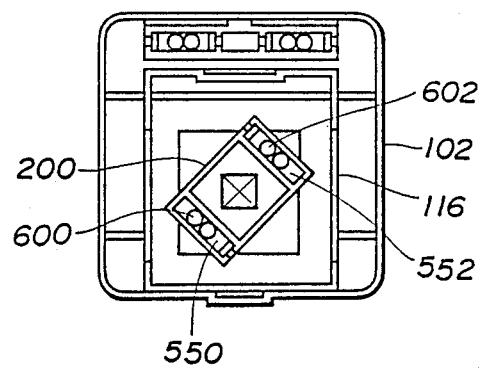
Figure 42:
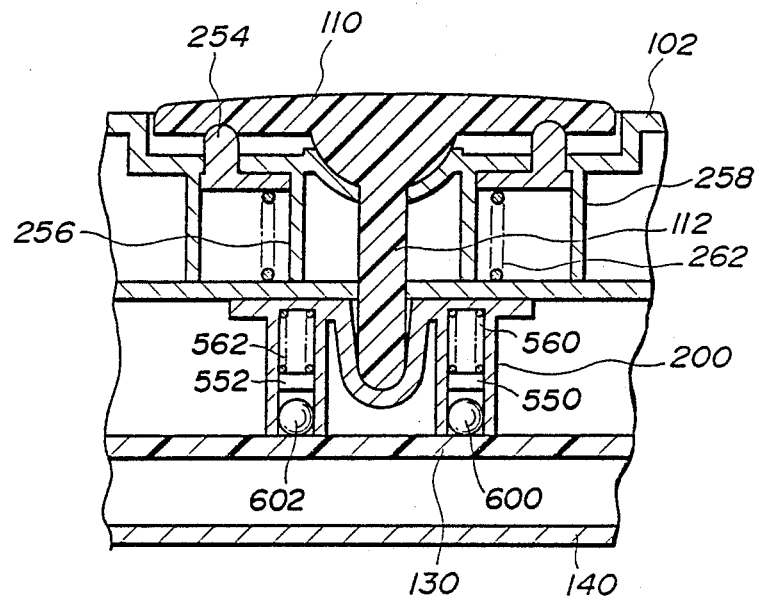

As shown in FIG. 30, slider elements 520 and 522 retaining two sets of ball contact pairs 500 and 502 are disposed as slanted about 45 degrees with respect to the moving direction of the slider 200 in this embodiment The slider elements 520 and 522 thus disposed are essentially the same as the slider elements in the previously mentioned embodiment provided that the box-shaped compartment housing the slider elements 520 and 522 of the slider 200 is disposed as slanted about 45 degrees with respect to the moving direction of the slider 200. Hence, two sets of fixed contact groups U3 and D3 corresponding to the two sets of ball contact pairs 500 and 502 comprise six fixed contacts, respectively, as shown in FIG. 31. The neutral positions of the two sets of ball contact pairs 500 and 502 are indicated with A and B. Fixed contacts 350 and 352 belonging to the fixed contact group U3 are disposed in the moving track along which the ball contact pair 500 moves downward from the neutral position when the push plate 110 is pressed at the UP-marked section thereof; fixed contacts 354 and 356 are disposed in the moving track along which the ball contact pair 500 moves upward from the neutral position when the push plate 110 is pressed at the DOWN-marked section thereof; fixed contacts 354 and 358 are disposed in the moving track along which the ball contact pair 500 moves leftward from the neutral point when the push plate 110 is pressed at the RIGHT-marked section thereof; and fixed contacts 352 and 360 are disposed in the moving track along which the ball contact pair 500 moves rightward from the neutral position when the push plate 110 is pressed at the LEFT-marked section thereof. Similarly, as shown in FIG. 32, fixed contacts 370, 372, 374, 276, 378 and 380 belonging to the fixed contact group D3 are disposed in the moving tracks, respectively, along which the ball contact pair 502 moves vertically and horizontally.

As shown in FIG. 31, the control circuit for driving as selected one of the two mirrors of a car using the fixed contact groups U3 and D3 disposed as described above functions as follows. Namely, when the ball contact pairs 500 and 502 move downward from the neutral position shown in FIG. 33 while rolling together until the fixed contacts 350 and 352 belonging to the fixed contact group U3 are electrically connected to each other by the ball contacts, the fixed contacts 370 and 372 belonging to the fixed contact group D3 are electrically connected to each other at the same time, so that the motor for tilting the mirror surface about the horizontal axis runs forwardly to tilt the mirror surface upward (as in FIG. 34). Similarly, when the ball contact pairs 500 and 502 move upward while rolling together until the fixed contacts 354 and 356 belonging to the fixed contact group U3 are electrically connected to each other, the fixed contacts 374 and 376 belonging to the fixed contact group D3 are electrically connected to each other at the same time, so that the motor for tilting the mirror surface about the horizontal axis runs reversely to tilt the mirror surface downward (as in FIG. 35). When the ball contact pairs 500 and 502 move rightward while rolling together until the fixed contacts 352 and 360 belonging to the fixed contact group U3 are electrically connected, the fixed contacts 372 and 380 belonging to the fixed contact group D3 are electrically connected to each other at the same time, so that the motor for turning the mirror surface about the vertical axis runs forwardly to turn the mirror surface leftward (as in FIG. 36). Similarly, when the ball contact pair 500 and 502 move leftward while rolling together until the fixed contacts 354 and 358 belonging to the fixed contact group U3 are electrically connected to each other, the fixed contacts 374 and 378 belonging to the fixed contact group D3 are electrically connected to each other at the same time, so that the motor for turning the mirror surface about the vertical axis runs reversely to turn the mirror surface rightward (as in FIG. 37). In the description made in the foregoing, each fixed contact group consists of six fixed contacts independent of one another. However, since the fixed contacts 352 and 354 as well as the fixed contacts 356 and 360 belonging to the fixed contact U3 are always connected electrically to each other, respectively, and the fixed contacts 370 and 378 as well as the fixed contacts 372 and 374 belonging to the fixed contact group D3 are always connected electrically to each other, respectively, in practice, the each of the fixed contact groups U3 and D3 is composed of four independent fixed contacts (as in FIG. 38).

FIGS. 39 thru 45 show an embodiment of a control switch having been described with reference to FIGS. 30 thru 38 to which the switch unit using the modified slider elements having been described with reference to FIGS. 7 and 8 is applied. The modified slider elements are incorporated in both the sliders of the 4-way switch and changeover switch, respectively. The same or similar elements as in the embodiment having described with reference to FIGS. 30 thru 38 are indicated with the same reference numerals.

Figure 43:
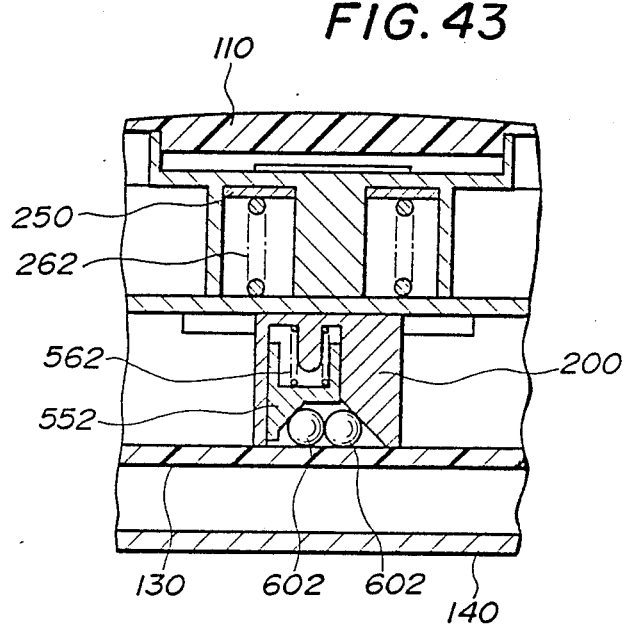
Figure 44:
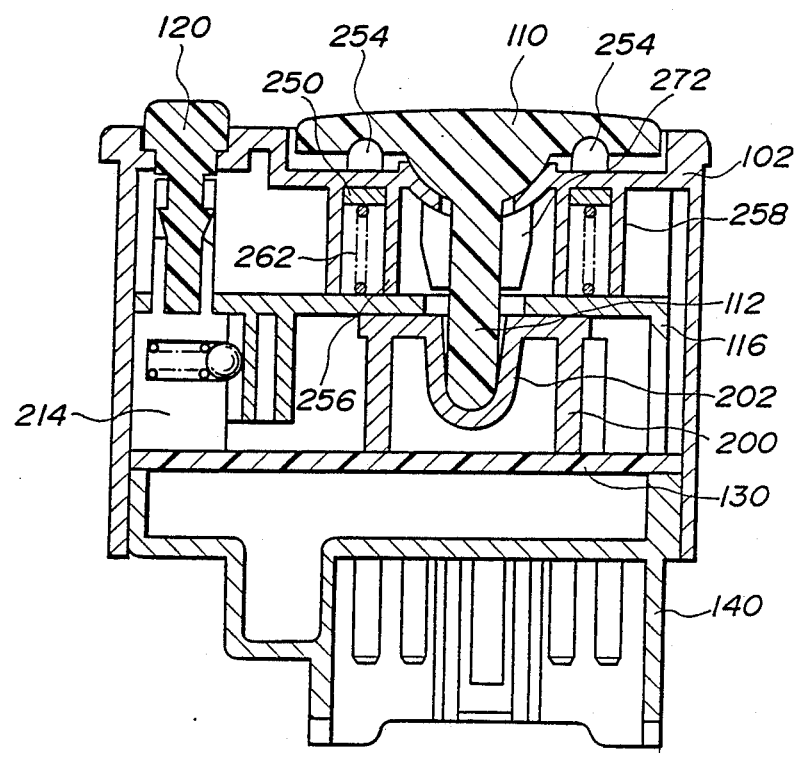

Two sets of slider elements 550 and 552 retaining two sets of ball contact pairs 600 and 602, respectively, forming the 4-way switch are housed in box-shaped compartments, respectively, disposed opposite to each other and as slanted 45 degrees with respect to the moving direction of the slider 200. Two sets of slider elements 554 and 556 retaining two sets of ball contacts 610 and 612, respectively, composing the changeover switch are housed in box-shaped compartments, respectively, disposed in line with the moving direction of the slider 214. As shown in FIG. 43, the slider elements have a nearly same shape. The slider elements 550 and 552 are disposed slidably along the opposite vertical walls in the box-shaped compartment of the slider 200 and also perpendicularly to the PCB 130, and they are forced toward the PCB 130 by means of compression coil springs 560 and 562. The slider elements 550 and 552 have slopes which are in contact with the corresponding ones of the ball contacts in pairs 600 and 602. Namely, each slider element forces a corresponding one of the ball contacts in pair toward the PCB 130, while the other ball contact is in contact with the slope formed on the lower end of the box-shaped compartment. The ball contact pairs 600 and 602 are housed in spaces, respectively, defined by the slope of each slider element, horizontal surface contiguous to the slope, slope formed on the lower end of each box-shaped compartment and the PCB and are forced by means of the compression coil springs 560 and 562, so that the contact pressure to the fixed contacts is stable as having been described previously.

Figure 45:
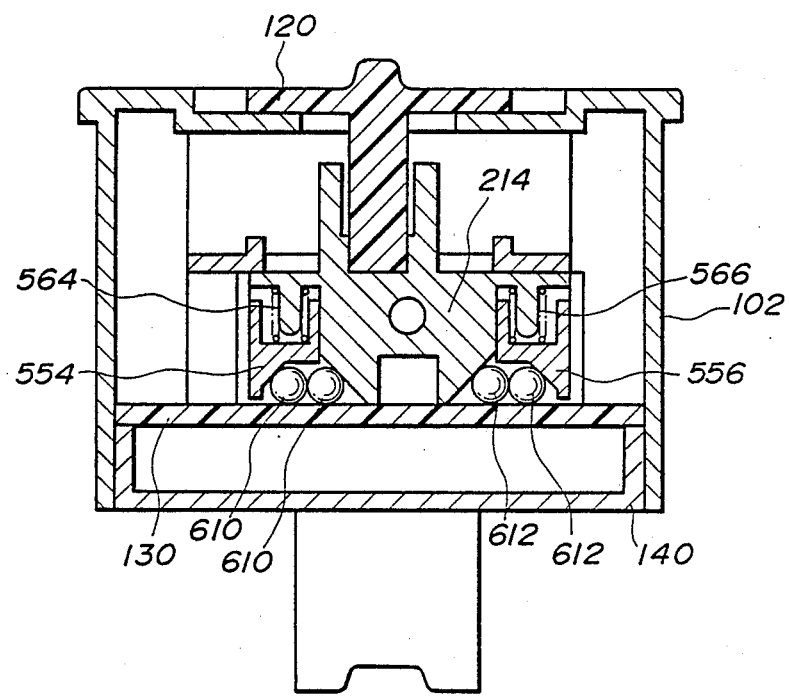

The two sets of slider elements 554 and 556 retaining the two sets of ball contacts 610 and 612 composing the changeover switch as shown in FIG. 45 are housed in the box-shaped compartment formed in the slider 214. Each slider element is disposed slidably along the vertical wall of the box-shaped compartment formed in the slider 214 and perpendicularly to the PCB 130, and forced toward the PCB 13 by means of the compression coil springs 564 and 566 as having been previously described with the slider elements 550 and 552 forming together the 4-way switch.

It will be apparent to those skilled in the art that the present invention is not limited to the specific embodiments and variant embodiments having been described in the foregoing, but the arrayed directions of the ball contact pairs, number of ball contact pairs and shape of the slider elements may be changed within the present invention without departing from the scopes and spirits of the appended claims.

What is claimed is:

1. A switching device, comprising:
    at least two fixed contacts disposed in a substantially straight line on a substrate having formed therein a printed circuit board and housed in an enclosure;
    a moving contact pair comprising two electrically conductive balls movably disposed on said substrate;
    an actuator comprising a slider element having two slopes which are in contact with said two balls, respectively, and a box-shaped slider housing said slider element in such a manner that said two balls are in contact with each other and also with said substrate, and which moves said moving contact pair;
    means of guiding said actuator in a direction parallel to said straight line;
    a resilient member disposed between said slider element and said slider of said actuator to force said slider element toward said substrate; and
    an actuating member for moving said actuator in a direction parallel to said straight line;
    said moving contact pair being let, by manually operating said actuating member, to take a different contact position with respect to said fixed contacts.

2. The switching device according to claim 1, wherein there is disposed between said enclosure and slider of said actuator another resilient member for forcing said actuator in a direction parallel to said straight line.

3. The switching device according to claim 1, wherein said actuating member is built including an operating knob formed integrally with said slider and extending out of an opening formed in said enclosure, said opening being so formed that said operating knob is movable in a direction parallel to said substrate.

4. The switching device according to claim 3 wherein said fixed contact pair comprises first, second and third fixed contacts arrayed in a straight line, said moving contact pair taking a first contact position where it is contact with the adjoining first and second fixed contacts when said actuating member abuts one end of said opening, and said moving contact pair taking a second contact position where it is in contact with the adjoining second and third fixed contacts when said actuating member abuts the other end of said opening.

5. The switching device according to claim 1, wherein said actuating member comprises an operating lever disposed tiltably in relation to said enclosure, said operating lever extending through an opening formed in said enclosure and pivotably supported to said actuating member, so that said actuator is moved correspondingly to a tilted direction of said operating lever.

6. The switching device according to claim 5, wherein said fixed contact pair comprises first, second and third fixed contacts arrayed in a straight line, said moving contact pair taking a first contact position where it is contact with the adjoining first and second fixed contacts when said actuating member abuts one end of said opening, and said moving contact pair taking a second contact position where it is in contact with the adjoining second and third fixed contacts when said actuating member abuts the other end of said opening.

7. A switching device, comprising:
    at least two fixed contacts disposed in a substantially straight line on a substrate housed in an enclosure;
    a moving contact pair comprising two electrically conductive balls movably disposed on said substrate;
    an actuator comprising a slider element having a slope which is in contact with one of said two balls and a box-shaped slider having a slope which is in contact with the other of said two balls and which houses said slider element so that the latter is movable in a direction nearly perpendicular to said substrate;
    a resilient member disposed between said slider element and slider and which forces said slider element toward said substrate; and
    means of guiding said actuator so that the latter is movable in a direction parallel to said substrate; and
    an actuating member for moving said actuator in a direction parallel to said substrate;
    said moving contact pair taking a different contact position with respect to said fixed contacts depending upon whether said actuating member is operated or not.

8. A switching device applied to a control switch for use with a posture-adjustable automotive mirror incorporating two electric motors for tilting the mirror surface up and down and turning it rightward and leftward, respectively, and which has a manual operating member supported pivotably to an enclosure and provided with four markings to indicate said tilted and turned directions, respectively, of said mirror surface, comprising:
    plural sets of fixed contact groups disposed on an insulative substrate provided inside an enclosure and which comprises a plurality of fixed contact pairs spaced from one another;
    plural sets of electrically conductive ball contact pairs disposed correspondingly to said fixed contact groups, respectively and movable on said substrate;
    an actuator comprising plural slider elements disposed correspondingly to said plural sets of ball contact pairs, respectively, and having slopes which are in contact with the ball contact pairs, respectively, and retain the ball contact pairs so as to be in contact with each other and also with said substrate, and a slider housing said plural slider elements, and which moves said plural sets of ball contact pairs;

resilient members disposed between each of said slider elements and said slider, respectively, to force said slider elements in the direction of said substrate; and means of guiding the sliding of said actuator so that each of said ball contact pairs is put into contact with any selected one of said plural fixed contact pairs composing each of said fixed contact groups;

said manual operating member has an actuating rod extending toward said substrate, said slider being slid, when any of the direction-marked sections of said manual operating member is pressed, in a certain direction related with said pressed direction-marked section under the tilting motion of said actuating rod due to the pressing of the manual operating member, whereby each of said ball contact pairs takes a different contact position in which it is contact with any of the fixed contact pairs belonging to each of said fixed contact group.

9. The switching device according to claim 8 wherein said fixed contact groups are disposed on said substrate in four sets correspondingly to the four direction markings on said manual operating member, each fixed contact group comprising two fixed contact pairs spaced from each other; when any one of said manual operating member is pressed at any one of said direction-marked sections thereof, the two sets of ball contacts corresponding to the pressed one of the direction-marked sections and also to the section opposite to the pressed section being put into contact with any one of said fixed contact pairs, respectively, belonging to the two corresponding sets of fixed contact groups, the remaining two sets of ball contact pairs being in contact or not in contact with the corresponding fixed contact groups.

10. The switching device according to claim 9, wherein said four sets of ball contact pairs normally take neutral positions, respectively, in which they are not in contact with any of said fixed contact groups; when said manual operating member is pressed at any one of the direction-marked sections thereof, two sets of ball contact pairs among said four sets of ball contact pairs, which correspond to said pressed direction-mark section and also to the section opposite to the pressed one, taking a first contact position where they are put into contact with the fixed contacts of one of the two fixed contact pairs belonging to the corresponding two sets of fixed contact groups; when said manual operating member is pressed at the direction-marked section opposite to said two sets of ball contact pairs taking a second contact position in which they are put into contact with the fixed contacts of the other of said two fixed contact pairs belonging to the corresponding two sets of fixed contact groups; two sets of ball contact pairs corresponding to the remainder of said direction-marked sections being not in contact with the corresponding contact group.

11. The switching device according to claim 10, wherein the fixed contact pairs belonging to said two sets of fixed contact groups corresponding to one of the direction-marked sections of said manual operating member and also to the direction-marked section opposite to the former one, respectively, are disposed in four straight lines, respectively, parallel to one another; two sets of ball contact pairs corresponding to the fixed contact groups being disposed in directions parallel to said straight lines; fixed contact pairs belonging to said two sets of fixed contact groups corresponding to the remaining two direction-marked sections, respectively, being disposed in other four straight lines perpendicular to said four straight lines and parallel to one another; two sets of ball contact pairs corresponding to the fixed contact groups, respectively, being arrayed in directions parallel to said other straight lines.

12. The switching device according to claim 9, wherein an inner casing housing said actuator in a space that said actuator defines with respect to said substrate is disposed as fixed within said enclosure; said means of guiding comprising guide recesses formed in said inner casing and protrusions formed as projecting from the top of said slider and which face said guide recesses.

13. The switching device according to claim 12, wherein there is formed in the center of the top of said enclosure an opening through which the actuating rod of said manual operating member is passed; there being formed in the top of said slider a concavity which receives the end of said actuating rod, the tilting of said actuating rod being converted into a sliding motion of said slider through the concavity.

14. The switching device according to claim 13, further comprising a plate-like member disposed between the top of said inner casing and inner surface of said enclosure, having formed in the center thereof an opening through which said actuating rod is passed and also having formed on one side thereof four protrusions extending outside of said enclosure; and another resilient member disposed between the other side of said plate-like member and the top of said inner casing and which forces said plate-like member toward said enclosure; said manual operating member being supported on the ends of said four protrusions and it being returned to its initial position with the spring force of said resilient members when the pressing of any of the direction-marked section of said manual operating member is released; said slider returning to said neutral position said two sets of ball contact pairs, among said four sets of ball contact pairs, formed on positions opposite to each other.

15. The switching device according to claim 8, wherein said fixed contact groups are disposed in two sets; each of said fixed contact groups comprising three fixed contacts arrayed in one straight line and two fixed contact pairs arrayed in two straight lines parallel to said one straight line and also to each other; when said manual operating member is pressed at one of the direction-marked sections thereof, each ball contact pair corresponding to said each fixed contact group taking a first contact position where it is put into contact with one of said two fixed contact pairs of said each fixed contact group; when said manual operating member is pressed at the direction-marked section thereof opposite to said pressed one, said each ball contact pair taking a second contact position in which it is put into contact with the other of said two fixed contact pairs of said each fixed contact group; when said manual operating member is pressed at one of the remaining direction-marked sections thereof, said each ball contact pair taking a third contact position where it is put into contact with the adjoining two fixed contacts among said three fixed contacts; when said manual operating member is pressed at the other of the remaining two direction-marked sections thereof, said each ball contact pair taking a fourth contact position in which it is put into contact with the adjoining other two fixed contacts of said three fixed contacts.

16. The switching device according to claim 8 wherein said fixed contact groups comprising plural fixed contacts are disposed in two sets; two sets of ball contact pairs corresponding to these fixed contact groups being arrayed along two straight lines slanted in relation to the moving direction of said actuator and parallel to each other; said slider being slid by means of said tilting motion due to the pressing of any one, pressed, of the direction-marked sections of said manual operating member in a certain direction related with the pressed direction-marked section, whereby said each ball contact pair is put into contact with any fixed contact pair belonging to the corresponding fixed contact group and takes a different contact position.

17. A switching device applied to a control switch for use with a posture-adjustable automotive mirror incorporating two electric motors for tilting the mirror surface up and down and turning it rightward and leftward, respectively, and which has a manual operating member supported pivotably to an enclosure and provided with four markings to indicate said tilted and turned directions, respectively, of said mirror surface, comprising:
  plural sets of fixed contact groups disposed on an insulative substrate provided inside an enclosure and which comprises a plurality of fixed contact pairs spaced from one another;
  plural sets of electrically conductive ball contact pairs disposed correspondingly to said fixed contact groups, respectively;
  an actuator comprising plural slider elements disposed correspondingly to said plural sets of ball contact pairs, respectively, and having slopes which are in contact with the balls of one of the ball contact pairs, and a slider having a slope which is in contact with the balls of the other of said ball contact pairs and which houses said plural slider elements so as to be slidable in a direction perpendicular to the arrayed direction of each of said ball contact pairs;
  resilient members disposed between each of said slider elements and said slider, respectively, to force said slider elements in the direction of said substrate; and
  means of guiding the sliding of said actuator so that each of said ball contact pairs is put into contact with any selected one of said plural fixed contact pairs composing each of said fixed contact groups;
  said manual operating member has an actuating rod extending toward said substrate, said slider being slid, when any of the direction-marked sections of said manual operating member is pressed, in a certain direction related with said pressed direction-marked section under the tilting motion of said actuating rod due to the pressing of the manual operating member, whereby each of said ball contact pairs takes a different contact position in which it is contact with any of the fixed contact pairs belonging to each of said fixed contact group.

18. The switching device according to claim 17, wherein said fixed contact groups are disposed on said substrate in four sets correspondingly to the four direction markings on said manual operating member, each fixed contact group comprising two fixed contact pairs spaced from each other; when any one of said manual operating member is pressed at any one of said direction-marked sections thereof, the two sets of ball contacts corresponding to the pressed one of the direction-marked sections and also to the section opposite to the pressed section being put into contact with any one of said fixed contact pairs, respectively, belonging to the two corresponding sets of fixed contact groups, the remaining two sets of ball contact pairs being in contact or not in contact with the corresponding fixed contact groups.

19. The switching device according to claim 17, wherein said fixed contact groups are disposed in two sets; each of said fixed contact groups comprising three fixed contacts arrayed in one straight line and two fixed contact pairs arranged in two straight lines parallel to said one straight line and also to each other; when said manual operating member is pressed at one of the direction-marked sections thereof, each ball contact pair corresponding top said each fixed contact group taking a first contact position where it is put into contact with one of said two fixed contact pairs of said each fixed contact group when said manual operating member is pressed at the direction-marked section thereof opposite to said pressed one, said each ball contact pair taking a second contact position in which it is put into contact with the other of said two fixed contact pairs of said each fixed contact group; when said manual operating member is pressed at one of the remaining direction-marked sections thereof, said each ball contact pair taking a third contact position where it is put into contact with the adjoining two fixed contacts among said three fixed contacts, when said manual operating member is pressed at the other of the remaining two direction-marked sections thereof, said each ball contact pair taking a fourth contact position in which it is put into contact with the adjoining other two fixed contacts of said three fixed contacts.

20. The switching device according to claim 17, wherein said fixed contact groups comprising plural fixed contacts are disposed in two sets; two sets of ball contact pairs corresponding to these fixed contact groups being arrayed along two straight lines slanted in relation to the moving direction of said actuator and parallel to each other; said slider being slid by means of said tilting motion due to the pressing of any one, pressed, of the direction-marked sections of said manual operating member in a certain direction related with the pressed direction-marked section, whereby said each ball contact pair is put into contact with any fixed contact pair belonging to the corresponding fixed contact group and takes a different contact position.

* * * * *